US006184868B1

(12) United States Patent
Shahoian et al.

(10) Patent No.: US 6,184,868 B1
(45) Date of Patent: *Feb. 6, 2001

(54) HAPTIC FEEDBACK CONTROL DEVICES

(75) Inventors: Erik J. Shahoian, San Leandro; Christopher J. Hasser; Louis B. Rosenberg, both of San Jose, all of CA (US)

(73) Assignee: Immersion Corp., San Jose, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/156,802

(22) Filed: Sep. 17, 1998

(51) Int. Cl.[7] .................................................. G09G 5/08
(52) U.S. Cl. .................................... 345/161; 345/156
(58) Field of Search .................................. 345/161, 156, 345/157, 158, 184; 395/99

(56) References Cited

U.S. PATENT DOCUMENTS

| 3,919,691 | 11/1975 | Noll ................................. 340/172.5 |
| 3,923,166 | 12/1975 | Fletcher et al. .................... 214/1 CM |
| 4,398,889 | 8/1983 | Lam et al. ............................ 434/45 |
| 4,477,043 | 10/1984 | Repperger ............................ 244/223 |
| 4,560,983 | 12/1985 | Williams ............................... 340/825 |

(List continued on next page.)

FOREIGN PATENT DOCUMENTS

| 0265011 A1 | 4/1988 | (EP) . |
| 0607580 A1 | 7/1994 | (EP) . |
| 0 626 634 A2 | 11/1994 | (EP) . |
| WO 92/00559 | 1/1992 | (WO) . |
| WO 95/20788 | 8/1995 | (WO) . |
| WO 97/20305 | 6/1997 | (WO) . |
| WO 97/31333 | 8/1997 | (WO) . |

OTHER PUBLICATIONS

Russo, "The Design and Implementation of a Three Degree–of–Freedom Force Output Joystick," Dept. of Mech. Eng., May 1990.

Rosenberg, "A Force Feedback Programming Primer—For PC Gaming Peripherals Supporting I–Force 2.0 and Direct –X 5.0," Immersion Corp., 1997.

Winey III, "Computer Simulated Visual and Tactile Feedback as an Aid to Manipulator and Vehicle Control," Dept. of Mech. Eng., MIT, Jun. 1981.

Rosenberg, "Virtual Fixtures as Tools to Enhance Operator Performance in Telepresence Environments," SPIE Telemanipulator Technology, 1993.

(List continued on next page.)

Primary Examiner—Richard A. Hjerpe
Assistant Examiner—Ronald Laneau
(74) Attorney, Agent, or Firm—James R. Riegel

(57) ABSTRACT

Haptic feedback control devices of the present invention include several embodiments. One embodiment includes a housing and a pair of moveable pincher members coupled to the housing. Each pincher member is contacted by a finger of the user when the device is operated and moveable in a degree of freedom approximately within a single plane. An actuator outputs force feedback on the pincher members and a sensor detects a position of the pincher members in the degrees of freedom. The device housing can include a fixed portion and a moveable portion, where the user contacts both fixed and moveable portions. A coupling, such as a flexure, allows the moveable portion to move relative to the fixed portion in a direction parallel to an outer surface of the moveable portion contacted by the user. An actuator outputs a force on the flexure to cause the moveable portion to move, such as an oscillating force to cause vibration. These improvements allow a user to feel force feedback and tactile feedback when operating the device. Applications include telemanipulator devices as well as interface devices and game controllers for computers.

50 Claims, 12 Drawing Sheets

U.S. PATENT DOCUMENTS

| | | | |
|---|---|---|---|
| 4,603,284 | 7/1986 | Perzley | 318/568 |
| 4,604,016 | 8/1986 | Joyce | 414/7 |
| 4,689,449 | 8/1987 | Rosen | 200/6 A |
| 4,706,294 | 11/1987 | Ouchida | 381/109 |
| 4,795,296 | 1/1989 | Jau | 414/5 |
| 4,800,721 | 1/1989 | Cemenska et al. | 60/393 |
| 4,823,634 | 4/1989 | Culver | 74/471 XY |
| 4,837,734 | 6/1989 | Ichikawa et al. | 364/513 |
| 4,853,874 | 8/1989 | Iwamoto et al. | 364/513 |
| 4,868,549 | 9/1989 | Affinito et al. | 340/710 |
| 4,949,119 | 8/1990 | Moncrief et al. | 364/578 |
| 4,983,901 | 1/1991 | Lehmer | 318/685 |
| 5,004,391 | 4/1991 | Burdea | 414/6 |
| 5,007,300 | 4/1991 | Siva | 74/471 XY |
| 5,044,956 | 9/1991 | Behensky et al. | 434/45 |
| 5,076,517 | 12/1991 | Ferranti et al. | 244/228 |
| 5,103,404 | 4/1992 | McIntosh | 318/568.22 |
| 5,107,262 | 4/1992 | Cadoz et al. | 341/22 |
| 5,116,180 | 5/1992 | Fung et al. | 414/5 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,189,355 | 2/1993 | Larkins et al. | 318/685 |
| 5,193,963 | 3/1993 | McAffee et al. | 414/5 |
| 5,197,003 | 3/1993 | Moncrief et al. | 364/410 |
| 5,203,563 | 4/1993 | Loper, III | 273/148 B |
| 5,220,260 | 6/1993 | Schuler | 318/561 |
| 5,223,776 | 6/1993 | Radke et al. | 318/568.1 |
| 5,235,868 | 8/1993 | Culver | 74/471 XY |
| 5,264,768 | 11/1993 | Gregory et al. | 318/561 |
| 5,286,203 | 2/1994 | Fuller et al. | 434/45 |
| 5,296,871 | 3/1994 | Paley | 345/163 |
| 5,313,230 | 5/1994 | Venolia et al. | 345/16 |
| 5,341,459 | 8/1994 | Backes | 395/95 |
| 5,354,162 | 10/1994 | Burdea et al. | 414/5 |
| 5,355,148 | 10/1994 | Anderson | 345/166 |
| 5,381,080 | 1/1995 | Schnell et al. | 318/566 |
| 5,389,865 | 2/1995 | Jacobus et al. | 318/568.11 |
| 5,396,266 | 3/1995 | Brimhall | 345/161 |
| 5,399,091 | 3/1995 | Mitsumoto | 434/61 |
| 5,405,152 | 4/1995 | Katanics et al. | 273/438 |
| 5,414,337 | 5/1995 | Schuler | 318/561 |
| 5,512,919 | 4/1996 | Araki | 345/156 |
| 5,513,100 | 4/1996 | Parker et al. | 364/167.01 |
| 5,542,672 | 8/1996 | Meredith | 463/37 |
| 5,576,727 | 11/1996 | Rosenberg et al. | 345/179 |
| 5,577,981 | 11/1996 | Jarvik | 482/4 |
| 5,587,937 | 12/1996 | Massie et al. | 364/578 |
| 5,589,828 | 12/1996 | Armstrong | 341/20 |
| 5,589,854 | 12/1996 | Tsai | 345/161 |
| 5,591,082 | 1/1997 | Jensen et al. | 463/38 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,666,473 | 9/1997 | Wallace | 345/420 |
| 5,691,898 | 11/1997 | Rosenberg et al. | 364/190 |
| 5,694,013 | 12/1997 | Stewart et al. | 318/561 |
| 5,709,219 | 1/1998 | Chen et al. | 128/782 |
| 5,714,978 | 2/1998 | Yamanaka et al. | 345/167 |
| 5,721,566 | 2/1998 | Rosenberg et al. | 345/161 |
| 5,724,106 | 3/1998 | Autry et al. | 348/734 |
| 5,731,804 | 3/1998 | Rosenberg | 345/156 |
| 5,734,373 | 3/1998 | Rosenberg et al. | 345/161 |
| 5,736,978 | 4/1998 | Hasser et al. | 345/173 |
| 5,739,811 | 4/1998 | Rosenberg et al. | 345/161 |
| 5,742,278 | 4/1998 | Chen et al. | 345/156 |
| 5,754,023 | 5/1998 | Roston et al. | 318/561 |
| 5,755,577 | 5/1998 | Gillio | 434/262 |
| 5,769,640 | 6/1998 | Jacobus et al. | 434/262 |
| 5,781,172 | 7/1998 | Engel et al. | 345/164 |
| 5,790,108 | 8/1998 | Salcudean et al. | 345/184 |
| 5,805,140 | 9/1998 | Rosenberg et al. | 345/161 |
| 5,825,308 | 10/1998 | Rosenberg | 341/20 |
| 5,889,670 | 3/1999 | Schuler et al. | 364/186 |
| 5,897,437 | 4/1999 | Nishiumi et al. | 463/47 |
| 5,929,846 | * 7/1999 | Rosenberg et al. | 345/161 |
| 5,944,151 | 8/1999 | Jakobs et al. | 188/267.1 |
| 5,986,643 | 11/1999 | Harvill et al. | 345/156 |
| 5,990,869 | 11/1999 | Kubica et al. | 345/163 |
| 6,020,876 | * 2/2000 | Rosenberg et al. | 345/157 |
| 6,024,576 | * 2/2000 | Bevirt et al. | 345/161 |
| 6,028,593 | * 2/2000 | Rosenberg et al. | 345/156 |
| 6,037,927 | 3/2000 | Rosenberg | 345/156 |

OTHER PUBLICATIONS

Rosenberg, "Virtual Haptic Overlays Enhance Performance in Telepresence Tasks," Dept. of Mech. Eng., Stanford Univ., 1994.

Gotow, et al., "Perception of Mechanical Properties at the Man–Machine Interface," IEEE CH2503–Jan. 1987, pp. 688–689.

Brooks, Jr., et al., "Project GROPE—Haptic Displays for Scientific Visualization," Computer Graphics, vol. 24, No. 4, Aug. 1990, pp. 177–185.

Howe, et al., "Task Performance with a Dextrous Teleoperated Hand System," Proc. of SPIE, vol. 1833, Nov. 1992.

Rosenberg, "Perceptual Design of a Virtual Rigid Surface Contact," Armstrong Lab., Apr. 1993, pp. i–40.

Atkinson, et al., "Computing With Feeling," Comput. & Graphics, vol. 2, 1977, pp.97–103.

Kilpatrick, "The Use Of A Kinesthetic Supplement In An Interactive Graphics System," Dept. of Computer Science, Univ. of North Carolina, Chapel Hill, 1976, pp. i–175.

Wiker, et al., "Development of Tactile Mice for Blind Access to Computers: Importance of Stimulation Locus, Object Size, and Vibrotactile Display Resolution," Proc. of the Human Factors Society $35^{th}$ Annual Meeting, 1991.

Hasser, C. et al., "Tactile Feedback with Adaptive Controller for a Force–Reflecting Haptic Display," Parts 1 and 2, IEEE 0–7803–3131–1, 1996, pp. 526–533.

Hasser, C., "Tactile Feedback for a Force–Reflecting Haptic Display," School of Eng., Univ. of Dayton, Dayton, OH, 1995, pp. 1–98.

Dennerlein, et al., "Vibrotactile Feedback for Industrial Telemanipulators," $6^{th}$ Annual Symp. On Haptic Interfaces for Virtual Environment and Teleoperator Systems, ASME IMECE, Nov. 1997, pp. 1–7.

Dennerlein, Jack et al., "Commercialization of Vibrotactile Feedback for Telemanipulation and Virtual Environments," 1997, Phase I Final Report for ONR Contract N00014–96–C–0325 (not published or publicly available).

Minsky, et al., "Feeling and Seeing: Issues in Force Display," ACM 089791–351–5/90/0003, pp. 235–242 270.

Iwata, Hiroo, "Artificial Reality with Force–feedback: Development of Desktop Virtual Space with Compact Master Manipulator," Computer Graphics, vol. 24, No. 4, Aug. 1990, pp. 165–170.

Akamatsu, et al., "Multimodal Mouse: A Mouse–Type Device with Tactile and Force Display," Presence, vol. 3, No. 1, Winter 1994, pp. 73–80.

Jones, et al., "A Perceptual Analysis of Stiffness," Experimental Brain Research, 1990.

Ouh–young, "Force Display in Molecular Docking," Dept. of Computer Science, Univ. of North Carolina, Chapel Hill, 1990.

Yokokohji, et al., "What You Can See is What You Can Feel—Development of a Visual/Haptic Interface to Virtual Environment," Proc. VRAIS 1996.

Batter, et al., "GROPE–1: A Computer Display to the Sense of Feel," Proc. IFIP Congress 1971, pp. 759–763.

Adachi, et al., "Sensory Evaluation of Virtual Haptic Push–Buttons," Technical Research Center, Suzuki Motor Corp., Yokohama, 1994.

Adelstein, et al., "Design and Implementation of a Force Reflecting Manipulandum for Manual Control Research," NASA–Ames Research Center/Dept. of Mech. Eng., MIT, 1992.

Kotoku, et al., "Environment Modeling for the Interactive Display (EMID) Used in Telerobotic Systems," IEEE/RSJ Int'l Workshop on Intelligent Robots and Systems, Nov. 1991, pp. 999–1004.

Su, et al., "The Virtual Panel Architecture: A 3D Gesture Framework," IEEE 0–7803–1363, Jan. 1993, pp. 387–393.

Yamakita, et al., "Tele–Virtual Reality of Dynamic Mechanical Model," Proc. of IEEE/RSJ Int'l Conf. On Intelligent Robots and Systems, Jul. 1992, pp. 1103–1110.

Buttolo, et al., "Pen–Based Force Display for Precision Manipulation in Virtual Environments," IEEE 0–8186–7084, Mar. 1995, pp. 217–224.

Bejczy, et al., "The Phantom Robot: Predictive Displays for Teleoperation with Time Delay," IEEE CH2876, Jan. 1990, pp. 546–550.

Adelstein, et al., "A High Performance Two–Degree–of–Freedom Kinesthetic Interface," MIT, 1992, pp. 108–112.

Kelley, et al., "MagicMouse: Tactile and Kinesthetic Feedback in the Human–Computer Interface Using an Electromagnetically Actuated Input/Output Device," Dept. of Elec. Eng., Univ. of British Columbia, Oct. 1993.

Ouh–young, et al., "Creating an Illusion of Feel: Control Issues in Force Display," Computer Science Dept., Univ. of North Carolina, Chapel Hill, Sep. 1989, pp. 1–14.

Hannaford, et al., "Force–Feedback Cursor Control," NASA Tech Brief, vol. 13, No. 11, Item #21, Nov. 1989.

Hirota, et al., "Development of Surface Display," IEEE 0–7803–1363, 1993, pp. 256–262.

Ellis, et al., "Design and Evaluation of a High–Performance Prototype Planar Haptic Interface," DSC–vol. 49, Advances in Robotics, Mechatronics, and Haptic Interfaces, ASME Dec. 1993, pp. 55–64.

Millman, et al., "Design of a Four Degree–of–Freedom Force–Reflecting Manipulandum With a Specified Force/Torque Workspace," Proc. IEEE Int'l Conf. On Robotics and Automation, Apr. 1991, pp. 1488–1493.

Jacobsen, et al., "High Performance, High Dexterity, Force Reflective Teleoperator II," ANS Topical Mtg. On Robotics and Remote Systems, Feb. 1991.

Ouh–young, et al., Using a Manipulator for Force Display in Molecular Docking, IEEE CH2555, 1988, pp. 1824–1829.

Hannaford, et al., "Performance Evaluation of a Six–Axis Generalized Force–Reflecting Teleoperator," IEEE Trans. On Systems, Man, and Cybernetics, vol. 21, No. 3, May/Jun. 1991.

Burdea, et al., "Distributed Virtual Force Feedback," IEEE Workshop on Force Display in Virtual Environments and its Application to Robotic Teleoperation, May 1993.

Fischer, et al., "Specification and Design of Input Devices for Teleoperation," IEEE CH2876, Jan. 1990, pp. 540–545.

Kotoku, "A Predictive Display with Force Feedback and its Application to Remote Manipulation System with Transmission Time Delay," Proc. of IEEE/RSJ Int'l Conf. On Intelligent Robots and Systems, Jul. 1992.

Rosenberg, et al., "Commercially Viable Force Feedback Controller for Individuals with Neuromotor Disabilities," USAF Armstrong Lab., May 1996.

Schmult, et al., "Application Areas for a Force–Feedback Joystick," DSC–vol. 49, Advances in Robotics, Mechatronics, and Haptic Interfaces, ASM 1993, pp. 47–54.

Tan, et al., "Manual Resolution of Compliance When Work and Force Cues are Minimized," DSC–vol. 49, Advances in Robotics, Mechatronics, and Haptic Interfaces, ASME 1993, pp. 99–104.

Payette, et al., Evaluation of a Force Feedback (Haptic) Computer Pointing Device in Zero Gravity, DSC–vol. 58, Proc. of ASME Dynamics Systems and Control Div., Oct. 1996, pp. 547–553.

Ramstein, "Combining Haptic and Braille Technologies: Design Issues and Pilot Study," ACM 0–89791–776, Jun. 1996, pp. 37–44.

Rosenberg, et al., "The Use of Force Feedback to Enhance Graphical User Interfaces," Proc. SPIE 2653, 1996, pp. 243–248.

* cited by examiner

HAPTIC FEEDBACK CONTROL DEVICES

Certain inventions provided herein were made with government support under Contract Number N00014-98-C-0220, awarded by the Office of Naval Research. The government has certain rights in these inventions.

BACKGROUND OF THE INVENTION

The present invention relates generally to the interfacing with computer and mechanical devices by a user, and more particularly to devices used to interface with computer systems and telemanipulator devices and which provide haptic feedback to the user.

Humans interface with electronic and mechanical devices in a variety of applications, and the need for a more natural, easy-to-use, and informative interface is a constant concern. In the context of the present invention, humans interface with computer devices for a variety of applications. One such application is the control of telemanipulator devices to interface with physical environments. Other applications include interacting directly with computer-generated environments such as simulations, games, and application programs.

Telemanipulator devices are often used for remote manipulation of physical objects and items in areas that can be difficult or unavailable for humans to operate directly. For example, telemanipulator devices can be used in hazardous environments, such as radioactive areas or extremely hot areas, to manipulate items in that environment. Other areas where these devices are commonly used include underwater or the ocean, outer space, areas having poisonous gasses in the air, etc. With these devices, exploration of an environment, retrieval of samples from the environment, or operation and maintenance of equipment within the environment can be performed with little risk to humans.

A typical telemanipulator includes a master end effector (or "master") and a slave unit (or "slave"). An operator or user manipulates the master device in provided degrees of freedom, control signals are transmitted from the master to the slave, and the slave is moved and manipulated in a fashion corresponding to the manipulation of the master. In some telemanipulator devices, the slave sends back information to the master indicating a present state of the slave or providing information about the slave's environment. The slave is commonly a robot arm having one or more instruments or devices attached to the arm. For example, a parallel jaw gripper can be attached to the robot arm and moved within the slave's environment to grasp, pick up, and move objects. Alternatively, or additionally, the slave end effector can include a camera, light source, welding torch, wrench, screwdriver, cutting blade, or other instrument. The slave can be mounted on a static surface, or can be placed on a mobile entity such as a vehicle that can be, for example, piloted using remote control. A computer is preferably used to interface the master with the slave, to provide appropriate signals in bi-directional communication, and perform processing of signals or automated control of the slave when necessary.

The master end effector can take a variety of forms. One configuration uses a joystick-like controller to manipulate the slave. The operator moves the joystick handle in two or more degrees of freedom, which moves designated portions of the slave in corresponding degrees of freedom. One problem with joystick master controllers is that the control of the slave is not very intuitive, and achieving proficiency with this type of master requires considerable operator training. Other master end effectors are more intuitive for the operator. Exoskeletons or linkages can allow an operator to make movements with the master that cause closely-corresponding movements of the slave. For example, a grip can be attached to a linkage having six degrees of freedom, and the grip can be moved and rotated in space in a fashion that the operator wishes the instrument on the slave to move and rotate.

In some telemanipulator devices, force feedback or tactile feedback is also provided to the user, more generally known herein as "haptic feedback." These types of telemanipulator devices can provide physical sensations to the user manipulating the master end effector. When the slave impacts a surface or other obstruction, or otherwise interacts with its environment, it is desirable that the operator sense this interaction. Thus, forces provided on the master end effector can help the operator guide and operate the slave more effectively. If the slave impacts a wall, a force corresponding to what the slave experiences can be output on the master end effector using motors or other actuators of the master device.

One problem with haptic feedback used in master end effectors of the prior art is that the haptic feedback provided to the operator concerning the interactions of the slave with its environment is very limited and/or not well correlated to fine control of the slave, so that the operator receives only a crude sense of what is happening in the slave environment. For example, higher frequency tactile cues such as occurs when two hard objects contact each other are omitted. Furthermore, for slave devices having a jaw gripper, there is no haptic feedback provided to the operator concerning the movement and interaction of the jaw gripper with other objects. In addition, current equipment for teleoperation can be expensive and often has reliability and stability problems in harsh environments such as underwater oil rig maintenance.

Another problem is the degree of control provided to the operator over the slave device. Master control over such slave instruments as a gripper is often crudely performed with devices such as buttons and triggers, which do not greatly help the operator manipulate the gripper to perform highly delicate operations, and do not provide an intuitive control mechanism.

In other interface applications, the user interacts not with a physical environment, but with a computer generated or virtual environment. For example, in virtual reality applications or computer games, an interface device is coupled to a host computer which is running an application program that provides an environment, such as a graphical environment. The computer generated environment is displayed on a device such as a computer display. The user manipulates controls such as a manipulandum joystick handle, mouse, etc.), buttons, switches, or the like, and sensors detect the manipulation and input signals to the host computer to allow corresponding manipulation of graphical objects displayed on a display screen. Haptic feedback can be added to such interface control devices to provide the user with a more interactive experience and to provide greater ease in interfacing and controlling computer-generated objects and environments. A problem with current haptic feedback devices, however, is that the haptic feedback is not very well integrated into some types of controllers, such as gamepads or other controllers besides traditional joysticks.

SUMMARY OF THE INVENTION

The present invention provides a haptic feedback control device which includes several improvements to the interface with computer systems and the control of objects. The controller device includes a force feedback pincher mechanism that provides a more natural control over physical or computer-implemented objects. A moveable portion of the housing allows tactile feedback independent of other controls to be output to the user.

More particularly, in one aspect of the present invention, a haptic feedback control device for inputting control signals to a computer and for outputting forces to a user of the control device includes a grip and a pair of moveable pincher members coupled to the grip. Each pincher member is contacted by a finger of the user when the device is operated, where each of the pincher members are moveable in a degree of freedom and the degrees of freedom are approximately within a single plane, such that when one of the pincher members is moved, the other pincher member is also moved approximately the same distance either towards or away from the first pincher member. An actuator is coupled to the pair of pincher members and is operative to output a force on the pincher members in the degree of freedom. A sensor is operative to detect a position of the pincher members in the degree of freedom and output a sensor signal indicative of the position which is received by the computer. Each of the pincher members preferably includes a finger pad for receiving a finger of the user, where the user operates the device by placing a thumb on one of the finger pads and an opposing finger on the other finger pad. The actuator outputs a linear force in a linear direction which is converted to a rotary force that is applied to each of the pincher members.

In a different aspect of the present invention, a haptic feedback control device inputs control signals to a computer and outputs forces to a user of the control device, and includes a housing including a fixed portion and a moveable portion, where the user grips both the fixed and moveable portions when using the device. A coupling, such as a flexure, is coupled between the moveable portion and the fixed portion and allows the moveable portion to move relative to the fixed portion in a direction parallel to a portion of an outer surface of the moveable portion that is contacted by the user. An actuator is coupled to the flexure and outputs a force on the flexure to cause the moveable portion to move with respect to the fixed portion. Preferably, the actuator outputs an oscillating force to cause the moveable portion to vibrate. A preferred embodiment of the device includes a control manipulable by the user and positioned on the moveable portion such that the user feels the force on said moveable portion as tactile feedback when operating the control, and where the control is fixed in position with reference to the moveable portion. For example, the control can be the force feedback pincher mechanism of the present invention or a portion thereof, or can be a button, joystick, or other control.

In one embodiment, the haptic feedback control device of the present invention that includes any of the above aspects is a master device in a telemanipulator system such that the grip is coupled to a linkage of a plurality of members that provides at least three degrees of freedom of motion to the control device, and where the computer controls a slave device in conjunction with motion of the master device. The slave device can include an arm linkage and an opening/closing gripper, where the gripper is controlled by the pincher members. In a different embodiment, the computer displays a graphical environment which with the user interacts using the force feedback control device of the present invention, such as a computer game, graphical user interface, or medical simulation. A local microprocessor can also be included in the control device that receives the sensor signal, reports the sensor signal to the computer, and controls low-level signals to the actuator. Other controls can also be included on the control device, such as a roller that is sensed by a sensor.

In another embodiment, a haptic feedback interface device includes a joystick having two degrees of freedom and a linkage coupled to the joystick for providing the two degrees of freedom. First and second grounded linear voice coil actuators are coupled to the linkage and apply a force to the joystick through the linkage, where a linear motion of a bobbin of the first actuator is approximately parallel to a linear motion of a bobbin of the second actuator. Preferably, the force output by one of the actuators is approximately parallel in direction with respect to a force output by the other actuator, and the forces are approximately orthogonal in direction with respect to a plane formed by two axes of rotation of the joystick.

A method of the present invention for controlling an object with a haptic feedback control device includes outputting a control signal to a computer, the control signal including information describing a manipulation by a user of the haptic feedback control device. The manipulation includes moving a finger pad of the control device in a degree of freedom such that the information in the control signal includes a representation of a position of the finger pad in the degree of freedom. Haptic feedback signals are received from the computer that include information causing a force to be output on the finger pad in the degree of freedom. The force feedback signals also include information causing a vibration of a moveable portion of a housing of the control device surrounding the finger pad. The vibration is preferably caused when the object controlled by the control device interacts with a different object. The object controlled by the user can be a computer-generated object displayed on a display screen or a physical object such as a slave unit in a telemanipulator system.

The improvements of the present invention provide a more natural haptic feedback interface device that is intuitive and easy to operate. The pincher mechanism of the present invention allows a user to easily control objects such as a gripper or virtual hand, and provides haptic feedback based on interactions of the controlled object to allow more detailed and accurate control. The moveable portion of the housing of the present invention provides another channel through which the user can experience haptic feedback independently of any other control mechanisms such as the pincher mechanism, allowing the user to experience feedback concerning interactions of the controlled object to a greater extent, which allows even further natural and accurate control of the object.

These and other advantages of the present invention will become apparent to those skilled in the art upon a reading of the following specification of the invention and a study of the several figures of the drawing.

BRIEF DESCRIPTION OF THE DRAWINGS

FIG. 10b is a side elevational view of an embodiment for providing force feedback on a button of the control device of FIG. 10a;

DETAILED DESCRIPTION OF PREFERRED EMBODIMENTS

Figure 1:
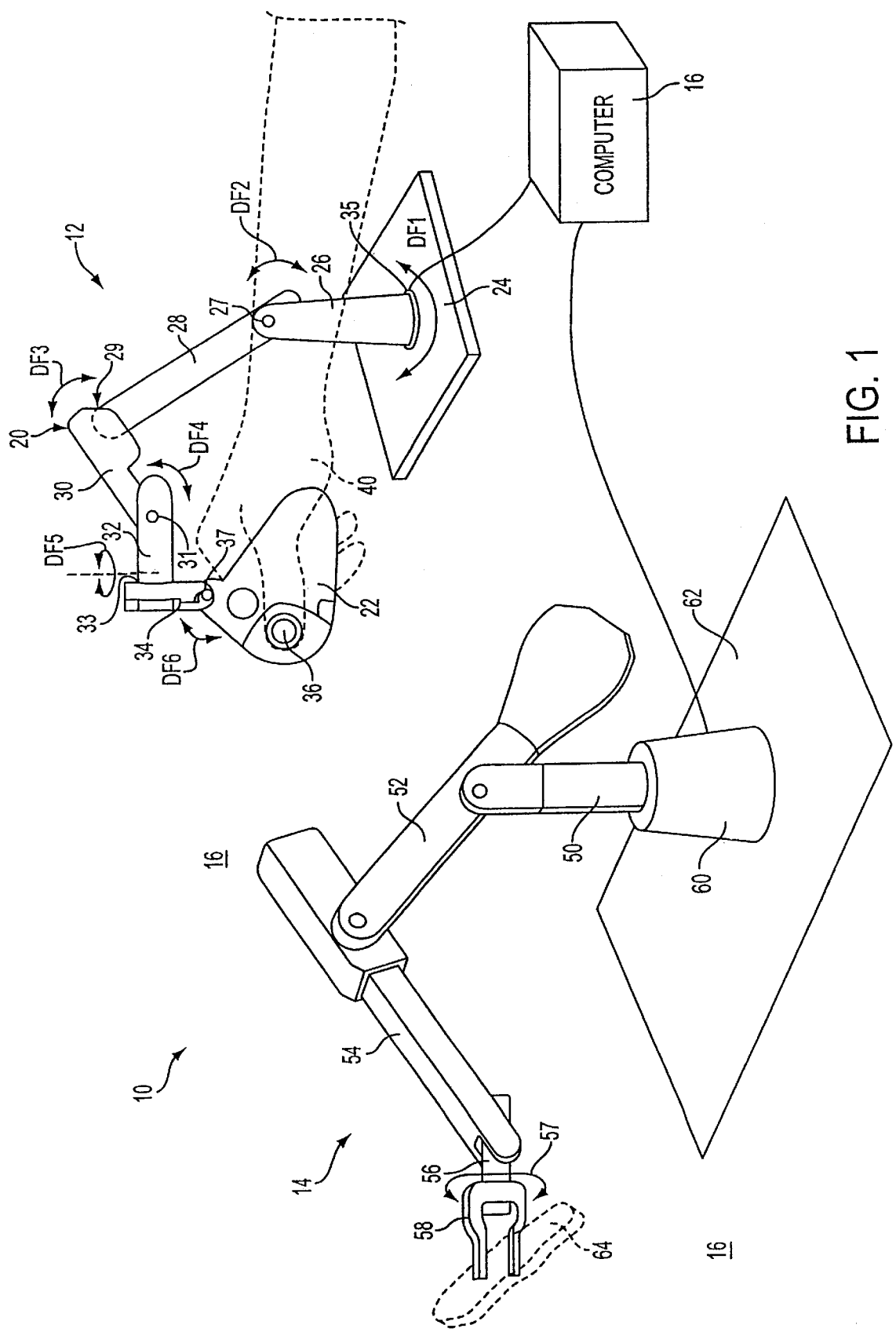
FIG. 1 is a perspective view of a first application for the haptic feedback control device of the present invention, in which a master device controls a slave unit in a telemanipulator system.

In FIG. 1, a telemanipulator system 10 is shown as a first application for use with the present invention. Telemanipulator system 10 includes a master end effector 12 and a slave unit 14. The illustrated system 10 is used to manipulate physical objects or perform tasks in a physical environment 15.

Master end effector 12 (or "master") is operated by a user to control the slave unit 14. Master 12, in the described embodiment, includes a linkage 20 and a hand controller 22. Linkage 20 is coupled to a ground surface 24 or other reference surface for stability and includes multiple members to allow the controller 22 to be moved in multiple degrees of freedom. For example, the described embodiment of linkage 20 includes members 26, 28, 30, 32, and 34, where each of these members is rotatably coupled to other members in a serial fashion by joints 27, 29, 31, and 33, respectively. Furthermore, base member 26 is rotatably coupled to ground surface 24 by a joint 35 and controller 22 is rotatably coupled to end member 34 by a joint 37. This configuration provides six degrees of freedom to the controller 22, labelled as DF1 through DF6 in FIG. 1. Other types of linkages or mechanisms can also be used to provide controller 22 with two or more degrees of freedom. Alternatively, controller 22 can be a free moving unit that includes accelerometers or other sensors that detect motion in three dimensions, as is well known to those skilled in the art.

Linkage 20 preferably includes a number of sensors (not shown) for detecting the position and/or motion of the controller 22. In the described embodiment, a sensor is coupled to each joint of linkage 20, but fewer sensors can be used in other embodiments. The sensors can be any of a variety of different types, including optical encoders, potentiometers, Hall effect sensors, etc. The signals from the sensors are transmitted to a computer 16. This transmission can be implemented in different ways, such as through wires, cables, or wireless transmission (radio signals, etc.).

Hand controller 22 is rotatably coupled to end member 34 of linkage 20 by joint 37 and is grasped, held, or otherwise physically contacted by the user. Preferably, joint 37 is unsensed and allows the controller 22 to be oriented relative to the member 34 to a position comfortable for the user. Either a single degree of freedom joint or a ball joint can be used as joint 37. Controller 22 includes a gripper control 36 and may include other controls for detailed manipulation of the slave unit 14. In a preferred embodiment, controller 22 is shaped approximately like a wedge for an easy, snug fit with the user's hand. An example of the user's grip is shown in FIG. 1 with reference to hand 40 shown in dashed lines. This embodiment is described in greater detail with reference to FIGS. 2–4 and 7. A different embodiment of controller 22 is described in detail with reference to FIGS. 8–9c.

In the described embodiment, controller 22 includes both sensor(s) and actuators. The sensors are used to detect the manipulation by the user of controls on controller 22 to operate the slave unit 14. For example, buttons, dials, switches, joysticks, knobs, or other control devices can be provided on controller 22 and be manipulated by the user. Furthermore, the controller 22 also includes actuators for providing forces on components of the controller 22. These forces inform the user of interactions of the slave unit 14 with objects within the slave's environment 15. A preferred implementation of the sensors and actuators in controller 22 is described in greater detail with reference to FIG. 2.

Computer 16 is an electronic device which in the described embodiment is used to coordinate the control of slave 14 by master 12. Computer 16 receives signals from master 12 which are used to control the slave 14. For example, the position and/or orientation of the controller 22 in three dimensional space can be sent to the computer 16 as various sensor signals from the sensors in the linkage 20. The computer 16 can then process the sensor signals into x, y, and z coordinates and/or orientation coordinates. Alternatively, the master 12 can include processing capability and can provide coordinates to the computer 16. In addition, the computer 16 can receive signals from master 12 for the controls on the controller 22, such as for buttons, a gripper control, a roller, and other devices, as explained in greater detail below. The computer 16 sends control signals to slave 14 based on the signals received from master 12. For example, the computer 16 sends out various motor control signals to move the gripper of the slave 14 to a position and orientation corresponding to the position and orientation of master 12. Furthermore, the computer sends control signals to activate various instruments on the slave 14 which may have been operated by the user with the controls of the master 12. Computer 16 can be a dedicated computer device, a standard desktop or portable computer, or other controller. Furthermore, a local microprocessor separate from the computer 16 can be provided in controller 22 to process local sensor information and output forces to the actuators to decrease the computational burden on the host. One embodiment of a suitable computer and local microprocessor is described with reference to FIG. 12.

Slave unit (or "slave") 14 is manipulated by the user to move about environment 15 to interact with the environment. For example, the slave 14 can be controlled to pick up objects, move objects, operate controls, or perform other tasks. The advantage of using slave 14 is that a human operator need not be physically present in the environment 15, which is often hostile or inconvenient for direct human presence. In other applications, the slave unit 14 is useful as an experimental device or as an aid for moving or manipulating physical objects.

In the described embodiment, slave 14 is an arm operative to move in multiple degrees of freedom within environment 15. Slave 14 can be implemented in a variety of ways; for example, the embodiment of FIG. 1 includes a base member 50, linkage members 52, 54, and 56, and a claw or gripper 58. Base member 50 is coupled to a ground member 60 that is coupled to a ground surface 62, where base member 50 can be rotated with respect to ground member 60. Linkage members 52, 54, and 56 are rotatably coupled in a chain to base member 50. Gripper 58 is rotatably coupled to the end of member 56 so that the gripper may be rotated as shown by arrow 57. The gripper 58 can also be opened or closed to allow the gripper to pick up and carry various physical objects. For example, an object 64 is shown being carried by gripper 58 in FIG. 1. In other embodiments, other instruments or tools may be coupled to member 56, such as a camera, light source, welding torch, wrench, screwdriver, cutting blade, or other instrument. The slave 14 can be mounted on a static surface, or can be placed on a mobile entity such as a vehicle that can be, for example, piloted through remote control.

Slave 14 typically includes actuators to cause the gripper 58 to move about in the environment 15. An actuator can be provided at each of the joints between the members 60, 50, 52, 54, 56, and 58. These actuators can be driven by signals from the computer 16 or directly from the master end effector 12 (if the master includes processing components). For example, computer 16 can be used to receive sensor signals from the master end effector 12, process the signals if necessary, and output appropriate driver signals to the actuators of slave 14. Computer 16 or equivalent circuitry can alternatively be included in the slave 14. Slave 14 also includes sensors (not shown) to sense the position of the gripper and the other members of the slave so that the position of the slave can be communicated to the computer and/or to the master end effector 12. By using such sensors, obstructions to the movement of the slave 14 can be detected. For example, the gripper 58 preferably includes a force sensor that detects the amount of force exerted on the gripper by an object held by the gripper. The force magnitude sensed by this gripper sensor is sent to the computer, which can use this information to provide haptic feedback on master 12, as described below.

It should be noted that the controller 22 can also be used in other applications besides telemanipulator devices. For example, a computer-generated environment, such as virtual reality environments or computer games, are also suitable for use with controller 22, where the controller can manipulate a virtual hand, tool, view, cursor, or other aspect of a graphical environment. Such computer generated environments are described in greater detail with respect to FIG. 10a.

Figure 2:
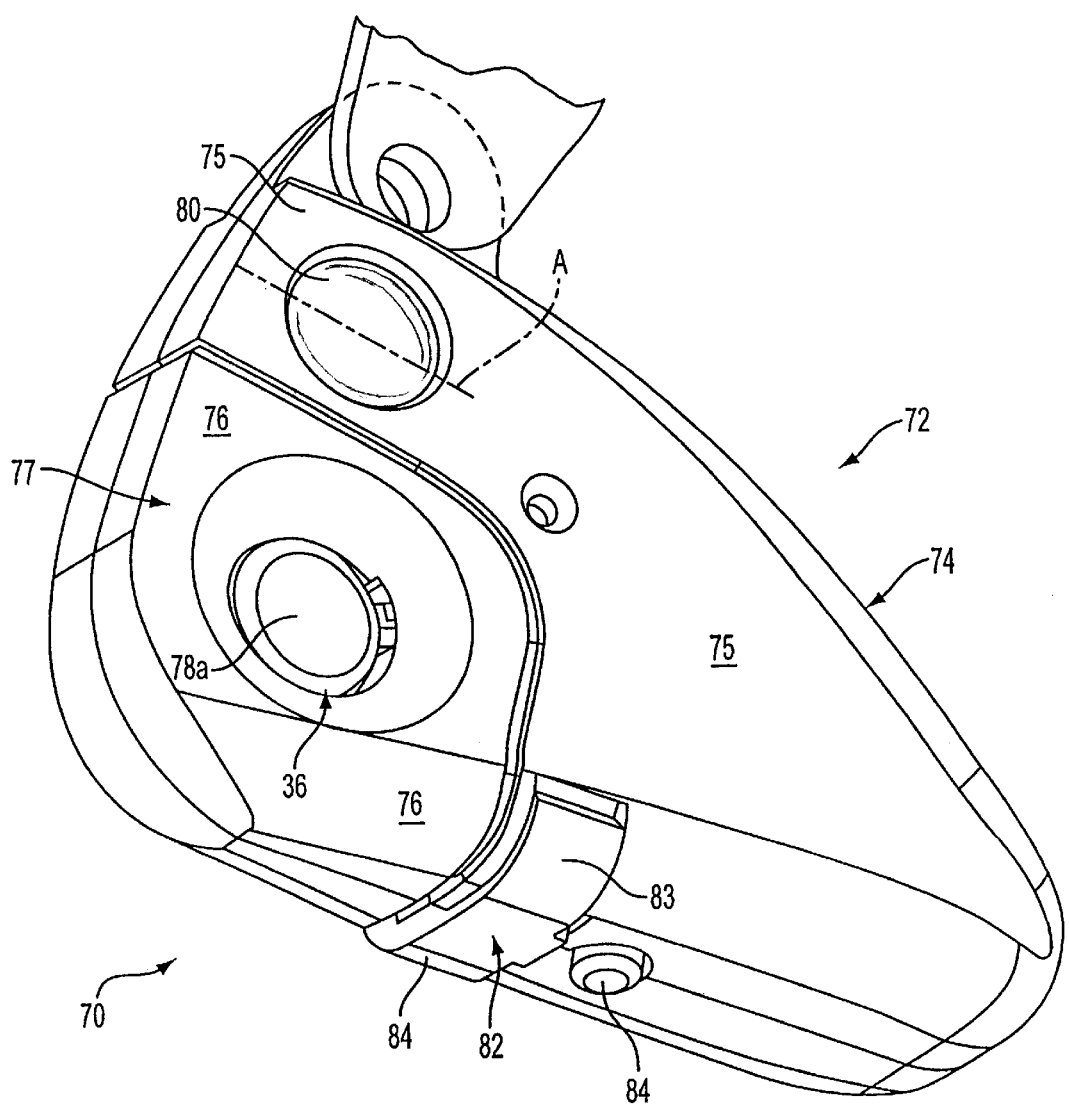
FIG. 2 is a perspective view of a preferred embodiment of a haptic feedback controller of the present invention for use with the systems of FIG. 1 or FIG. 10.

FIG. 2 is a perspective view of a preferred embodiment 70 of the controller 22 of the present invention for the master end effector 12. This embodiment is designed to provide an intuitive control mechanism that is comfortable and natural to use. The user holds the controller 70, as shown in FIG. 1, by placing the palm of a hand against side 72, which is smooth and rounded. Differently-sized hands are easily accommodated since the user can grasp the side 72 at different distances from the controls 36 and 80. The controller 70 is symmetrical such that the reverse side of the controller (the side not shown in FIG. 2) is substantially identical to the side shown in FIG. 2. Either a left-handed or a right-handed user may use the controller 70 with equal ease.

Controller 70 includes a housing 74 that includes a fixed portion 75 and a moveable portion 76. Moveable portion 76 of the present invention moves with respect to the fixed portion 75 in a direction parallel to the plane of the surface 77 of the controller 70 along the plane of contact between the user's finger and the moveable portion 76 (and transverse to the motion of finger pad 78a) to provide tactile feedback to the user, i.e. a sliding movement in shear with the skin of the finger contacting the surface of the moveable portion. For example, the movement can be a vibration that can indicate an interaction of the slave 14 in its environment 15, such as the slave arm impacting a surface or an object. The user typically has fingers contacting the moveable portion 76 while manipulating the controller 70, and thus can be informed of current slave conditions at any time. Such high frequency vibrations are useful to convey subtle interactions of the slave 14 with its environment which may not be conveyed through the use of low frequency force feedback (such as used for gripper control 36). For example, a momentary "tap" of the slave against a surface can be realistically conveyed to the user with momentary vibration of moving portion 76, which the user experiences tactilely through the skin. The operation of moveable portion 76 is described in greater detail with respect to FIG. 3. The moveable portion 76 preferably is textured, such as having multiple small bumps or grooves on its surface, which allow the vibrotactile sensations to be conveyed more effectively to the user's fingers that contact the moveable portion.

Controller 70 also includes a force feedback gripper control 36 of the present invention. The gripper control 36 is preferably used to control gripper 58 of the slave 14, but can be used to control a variety of motions or functions of the slave or other object in other embodiments. Finger pads 78a and 78b of the gripper control 36 are accessible through an opening in the moveable portion 76 of the housing 74. Figure pad 78b is not shown in FIG. 2 but is accessible on the opposite side of controller 70 through an aperture in moveable portion 76 similar to the one shown in FIG. 2. The finger pads are shaped to each comfortably receive a "fingertip portion" of a user's finger, e.g. the fingertips, side of a finger, tip and portion of a finger above first knuckle, etc. In addition, the finger pads 78 preferably include texturing, such as multiple small bumps or grooves, which allow the user's fingers to grip the pads more easily.

In its intended operation, the gripper control 36 is contacted at the finger pads 78a and 78b by the thumb of a user contacting one pad 78 (such as pad 78a) and with a finger opposing the thumb (e.g., index or middle finger of the user) contacting the other pad 78 (such as pad 78b). The user may then move the two finger pads 78a and 78b jointly, each finger pad in its own degree of freedom, towards each other by pushing the finger pads 78 with those fingers contacting the pads. This motion, for example, can be used to cause the jaws of gripper 58 to close together, where each jaw corresponds to a particular finger pad. Preferably, the position of the jaws in its degree of freedom corresponds to the position of the associated pad in the pad's degree of freedom (i.e. position control). When the pads 78 are released by the user, the pads preferably move away from each other in the degree of freedom due to an internal spring force until they stop at the initial rest position. This causes the jaws of the gripper 58 of the slave 14 to correspondingly open. Thus, the user can easily manipulate the movement of the gripper 58 by moving the gripper pads 78 towards and away from each other. The pads 78 are preferably linked so that as one pad 78 is moved, the other pad 78 moves a corresponding amount in the opposite direction. In a preferred embodiment, the pads 78 have about ½" range of motion from a fully open position to a fully closed position.

The gripper control 36 also preferably includes force feedback to inform the user of the interaction of the gripper with an object the gripper is gripping or holding. The force feedback can be provided in a variety of ways. In one embodiment, a force sensor in the gripper 58 senses the amount of force on the gripper 58 caused by the object held by the gripper. The computer 16, receiving this sensed force, can then command a corresponding force on the finger pads 78 in their degree of freedom to resist motion of the pads towards each other, thus simulating the feel of holding an object with the pads 78. The gripper sensor detects the position of the pads 78 and the computer 16 then can determine how much force to output based on the current position of the pads. In a different embodiment, the sensor in controller 70 can detect an amount of movement of the gripper pads 78, and an amount of force based on the position, velocity, or other motion of the pads can be determined by the computer 16 and output (or based on both the force sensed by the gripper 58 and the motion of the pads). The force output on the gripper portions 78 can be a spring force, for example. The force feedback thus provides the user with an indication of how far the gripper can be moved before an object it is holding blocks further movement. The operation of the gripper control 36 is described in greater detail with respect to FIG. 4.

In an alternate embodiment, the gripper control 36 can use rate control to command the movement of the jaws of the gripper on the slave 14 (or control some other object, such as a computer-generated object). For example, a spring force can constantly bias the pads to a center position in each pad's degree of freedom. The user can move the jaws by moving each pad against the spring force, where the amount of displacement of a pad away from the center position controls the magnitude of velocity of the corresponding jaw, and the direction of the pad away from the center position indicates the direction of motion of the jaw. In such an embodiment, finger rings or other members that attach the pad to the contacting finger can be used to allow the user to pull each pad away from its center position in its degree of freedom. In yet other embodiments, only a single finger pad 78 can be provided, such as on one side of the device. The single finger pad can operate like a button, but can provide proprtional control based on how far the button is pushed or pulled.

Roller 80 is also preferably included in controller 70 as an additional control for the user to manipulate. Roller 80 is preferably spherical in shape and partially protrudes from the surface of housing 74 through an aperture in the housing. Roller 80 preferably protrudes from the housing surface on both sides of controller 70. The user may rotate the roller 80 about an axis, such as axis A, to manipulate a motion or function of slave 14. For example, roller 80 can control gripper "wrist" rotation, i.e., the rotation of the gripper 58 about the axis extending through the gripper, as indicated by arrow 57 in FIG. 1. This prevents operator fatigue which can occur if the operator is required to rotate his or her wrist to rotate the gripper. In other embodiments, the roller 80 can be commanded to control different joints of the slave 14; for example, a button or other control can select a particular joint of the slave for the roller 80 to control, to allow an operator to control the slave 14 one joint at a time.

Roller 80 is preferably sensed and not actuated in the described embodiment; in other embodiments, an actuator can be used to apply forces to the roller, which may be appropriate in embodiments in which the roller 80 controls rotation of base member 50 or other member of the slave. Alternatively, an actuator coupled to roller 80 can be controlled to output detent forces or jolts based on the position of the roller, indicating to the user how far the roller has been rotated and allowing more precise control of the roller, e.g. a detent force can be output for each ten degrees of rotation in a particular direction. Other force sensations can also be output to help facilitate more accurate control of the roller, such as a centering spring force that biases the roller 80 to a rest position, e.g. the further the user moves the roller from the rest position, the greater the spring force opposing the motion of the roller in the direction away from the rest position. Such a spring force can be used as a rate control device, where the amount of deflection from the center position controls the rate of controlled functions, such as the rate of rotation of the gripper of the slave 14 as shown by arrow 57 in FIG. 1. Such forces can be controlled by a local microprocessor in some embodiments as described below with reference to FIG. 12.

Buttons 82 and 84 can also be positioned on controller 70 to provide additional functionality and control to the user. For example, in one embodiment, button 82 can control the opening and closing of the gripper 58 as an alternative to using gripper control 36, where the side 83 of the button 82 controls one direction and the other side 84 controls the opposite direction. Button 84 can control such functions as master indexing to temporarily allow the user to move controller 22 to a more convenient position without inputting control commands the slave 14 or other controlled object. Other functions can be assigned to buttons 82 and 84 in other embodiments. Furthermore, additional buttons or other controls (switches, dials, knobs, joysticks, trackballs, etc.) can also be provided on controller 70 if desired. In addition, other sensors can be provided for additional functions. For example, a deadman or safety switch (see FIG. 12) can be provided in the housing so that the actuators do not output force unless the user is grasping the controller 22 in the correct fashion.

Figure 3:
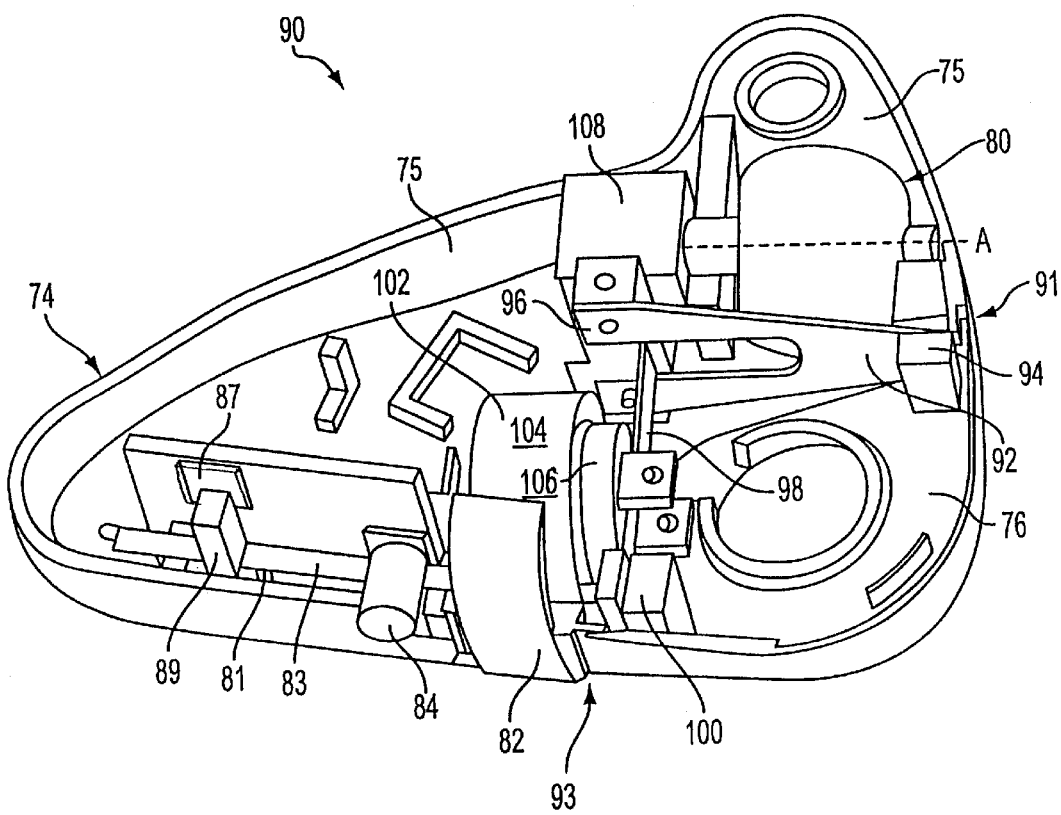
FIG. 3 is a perspective view of the mechanism of a first embodiment of the controller of FIG. 2.

FIG. 3 is a perspective view of one embodiment 90 of the controller 70 of FIG. 2, in which a portion of the housing 74 has been removed. In this embodiment, no force feedback gripper control 36 is provided. The moveable portion 76 of the housing is shown slidably contacting the fixed portion 75 of housing 74 at points 91 and 93. Leaf spring member 92 is coupled between member 94 and member 96, where member 94 is rigidly coupled to moveable portion 76 and member 96 is rigidly coupled to fixed portion 75. Similarly, leaf spring 98 is coupled between member 96 and member 100, where member 100 is coupled to the moveable portion 76. The leaf spring members 92 and 98 allow the moveable portion 76 to slide relative to the fixed portion 75 and return to a rest position when no forces are exerted on the moveable portion or leaf spring members. The two leaf spring members are preferably provided at a 90-degree relation to each other as shown for support of the moveable portion 76 and to constrain the moveable portion from moving too far and in an erratic manner (which can result from using only one leaf spring member). Furthermore, the leaf springs must be of a proper material and of sufficient stiffness in relation to the magnitude of force output by the actuator 102 to provide the desired vibration force sensation. The leaf spring members can be made of spring steel, beryllium copper, etc.

Controller 90 further includes an actuator 102 that is coupled to one of the leaf spring members 92 or 98; in the described embodiment, the actuator 102 is coupled to leaf spring member 98. Actuator 102 outputs a force on leaf spring member 98 to cause the moveable portion 76 to move relative to the fixed portion 75, i.e., there is differential motion between fixed portion 75 and moveable portion 76. In the preferred embodiment, actuator 102 outputs a vibration force, i.e. a periodic, oscillating force that causes corresponding oscillatory motion of the moveable portion 76. For example, in one preferred embodiment, the moveable portion can have about a 0.040 inch peak-to-peak displacement with respect to the fixed portion 75. The user senses this motion as a vibration of the moveable portion. The signals used to provide the vibration force on moveable portion 76 are preferably high frequency signals compared to the signals for gripper control 36, e.g. the high frequency signals can be on the order of about 30 Hz to 1 kHz. Other types of forces can be output in other embodiments, such as a jolt, varying-amplitude vibration, etc.

In the described embodiment, actuator 102 is a voice coil actuator. A magnet portion 104 of the actuator is moved relative to a coil portion or "bobbin" 106. Leaf spring member 98 is rigidly coupled to the bobbin 106, and the bobbin 106 moves relative to magnet portion 104 that is grounded to the fixed portion of housing 74. The voice coil actuator used in the described embodiment is described in greater detail with respect to FIG. 6. In alternate embodiments, the magnet portion 104 can be moved while the bobbin 106 is grounded to the housing 74.

In alternate embodiments, a sensor (not shown) can be provided to sense the motion of the moveable portion 76 relative to the fixed portion 75 of the housing. The sensor can detect the magnitude of vibration motion of the moveable portion 76 relative to the fixed portion 75. This can be used, for example, as a gain control for the output of the vibrotactile forces to automatically compensate the vibration to a standard magnitude, no matter the strength of the particular grip of the user. For example, if the sensor detects that the moveable portion 76 is only vibrating a small amount which is under the predetermined desired amount, the computer 16, local microprocessor, or other control circuitry can increase the power to the actuator to increase the vibration magnitude. This may be required when a particular user grasps the housing 74 too tightly too allow effective tactile sensations. Likewise, the gain of the forces can be reduced if the user is gripping the housing too loosely as detected by the sensor. The sensor can also be used to control tactile forces corresponding to a particular type of interaction of the slave 14; for example, a greater amplitude vibration may be desired when the slave 14 hits a surface rather than tapping a surface, and the sensor can help determine the magnitude of force to be output. Examples of sensors that can be used include Hall effect sensors or optical sensors, in which one portion of the sensor (e.g. detector) is mounted on the fixed portion 75, and the other portion of the sensor (e.g. emitter or magnet) is mounted on the moveable portion 76. Alternatively, the voice coil actuator itself can be used as a sensor, where the coil is used to apply forces and sense velocity (from which position can be determined), as is well known in the art; or where a voltage in a second coil that is proportional to the velocity of the bobbin is sensed, and from which position can be derived.

Roller 80 is shown as a sphere that has been partially cut away on two sides which is rotatably coupled to the fixed portion 75 of the housing, and which is rotatable about axis A. Sensor 108 is used to sense the rotation of roller 80, and can be a potentiometer, optical encoder, or other form of sensor. The signals from the sensor are sent to computer 16.

Switch 82 can be implemented as a dual switch as described above, where if one side of the switch is pressed, one signal is output, and if the other side is pressed, a different signal is output. In the described embodiment, the switch 82 can be coupled to a rotating shaft 83 and pusher member 85. When a side of switch 82 is pressed, the shaft and pusher member 85 rotate, causing the pusher member to contacts the appropriate pressure-sensitive switch 87 based on the side of the switch 82 pressed. This implementation of switch 82 saves space in the housing 74 for other components used in the embodiment of FIG. 4; other implementations may also be used.

Figure 4:
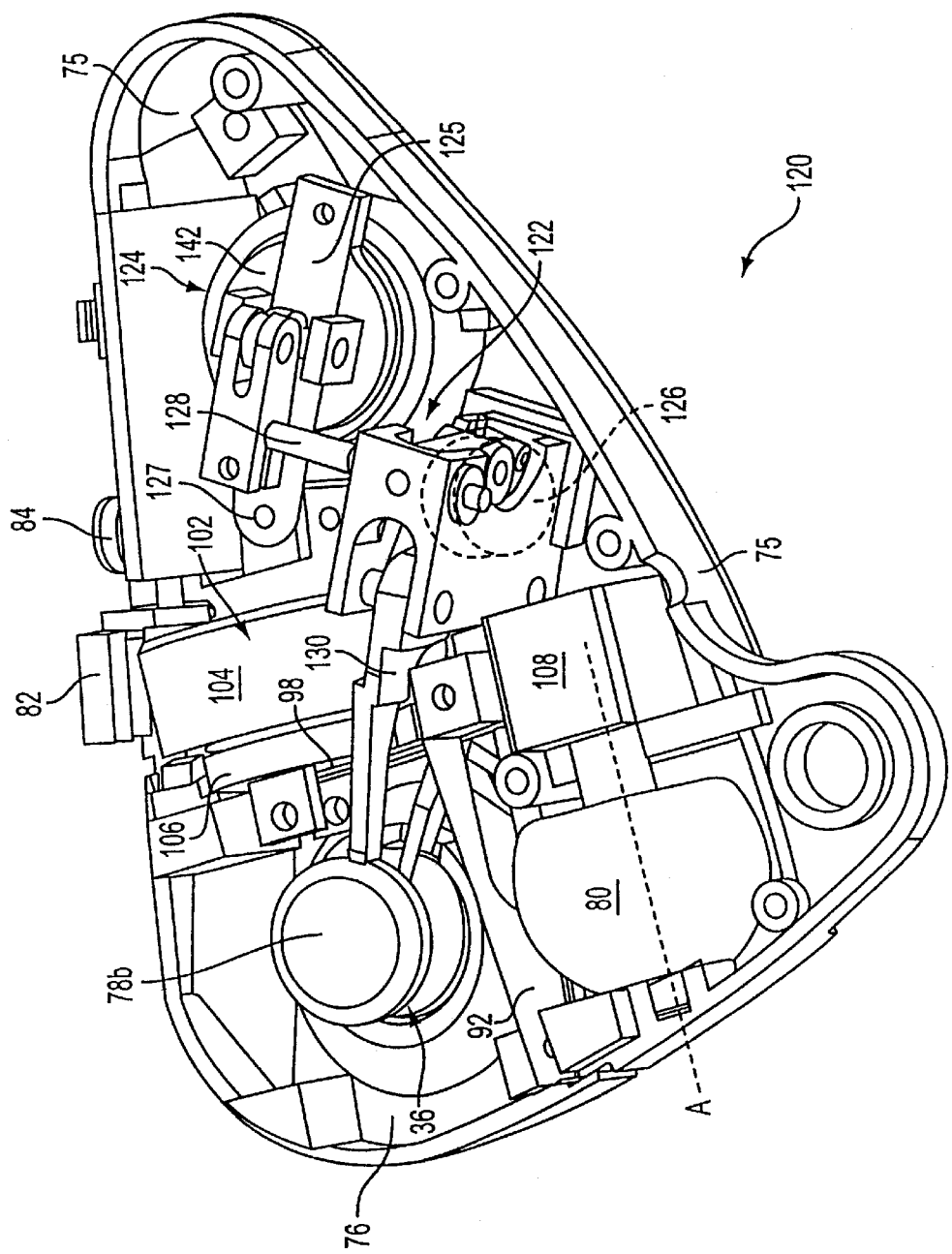
FIG. 4 is a perspective view of the mechanism of a second embodiment of the controller of FIG. 2.

FIG. 4 is a perspective view of a second, preferred embodiment 120 of the controller 70 of FIG. 2, including both the moveable portion 76 of the housing and the force feedback gripper control 36. A portion of the housing 74 is removed to show the mechanism within controller 70.

The mechanism for moving the moveable portion 76 of the housing is substantially the same as described with reference to FIG. 3. The moveable portion 76 is moveably coupled to the fixed portion 75 of housing 74 by leaf springs 98 and 92, which are provided at a 90-degree relation to each other for support of the moveable portion. Actuator 102 outputs forces on leaf spring member 98, which moves moveable portion 76 relative to fixed portion 75. In addition, this causes movement of moveable portion 76 relative to the gripper mechanism 36, including finger pads 78 and gripper members 130. As in the embodiment of FIG. 3, an oscillating force is preferably output to cause a vibration of moveable portion 76.

Embodiment 120 also includes force feedback gripper control 36, where gripper pads 78a and 78b are contacted and moved by the user's fingertips in a pincer motion to open and close a gripper, manipulate some other portion or instrument of slave 14, or manipulate some other object (such as a graphical object displayed by a computer). Pads 78a and 78b are coupled to a linkage mechanism 122 which is positioned within housing 74 as shown. The linkage mechanism is coupled to actuator 124, which is grounded to the fixed portion of housing 74. Actuator 124 can be any of several types of actuators, and is similar to actuator 102 in the preferred embodiment, e.g. both actuator 102 and 124 can be linear voice coil actuators. However, the forces output on gripper control 36 are preferably steady or low frequency resistance forces based on the position of the pads 78 in their degrees of freedom, where low frequency signals from the computer are used to control the force output (i.e., the frequency content of the signal itself is low, e.g. less than or equal to 50 Hz, but the control loop or servo loop between controller and actuator preferably has a much higher frequency, e.g. 1000 Hz). For example, spring or damping forces can be output. A preferred linkage mechanism 122, actuator 124, and operation of the gripper control 36 is described in greater detail with respect to FIG. 5. Furthermore, the moving portion of actuator 124, such as bobbin 142, is preferably coupled to the fixed portion 75 of the housing by a spring element 125. The spring element is coupled to the housing at point 127 in FIG. 4 and provides a bias to bobbin 142 in one direction that, in turn, biases the gripper elements 130 and gripper pads 78 to an open position, i.e. to move away from each other. This allows the finger pads 78 to return to an open rest position when the user is not exerting force on the pads. In an alternate embodiment, this spring return force can be supplied by actuator 124 to cause the pads to return to the rest position. For example, if a local microprocessor other control circuitry is included in controller 22, then the microprocessor can control the actuator 124 to provide this spring force at all times, regardless of any force feedback output on the gripper due to interactions of the slave or other controlled object.

In addition, a sensor 126 is also coupled to the linkage 122 to sense the position of the finger pads 78 in their respective degrees of freedom. Sensor 126 can be a relative sensor that detects the position relative to a designated reference position (such as a rest position); or an absolute sensor can be used. In the described embodiment sensor 126 measures the rotation of shaft 128, which is correlated with the amount of movement of the gripper pads 78 as explained with reference to FIGS. 5a and 5b. Since the range of motion of the gripper pads is known, the measured rotation is indicative of the distance between the finger pads. Sensor 126 can be a Hall effect sensor, an optical encoder, a potentiometer, photo diode sensor, a capacitive sensor, or other form of sensor.

The gripper control 36 provides colocated force feedback, i.e., the force feedback is in the same degree of freedom as the sensing and motion of the moved members. This is advantageous in a control system such as used for telemanipulator control, since forces can be felt in the dimension in which the slave is controlled, e.g. forces on the controlled gripper 58 arc felt by the user as forces on the gripper control 36, where the gripper pads 78 have similar movement to the two jaws of the gripper 58. This is a much more intuitive user interface than other types of telemanipulator controls for controlling devices such as a gripper, since it provides the illusion that the user is directly moving the gripper jaws when the gripper pads are moved. This type of control is also useful for controlling computer-generated objects such as a displayed virtual hand. The gripper control 36 is also a proportional control, allowing a range of motion of the jaws of the gripper to be controlled in detail rather than providing a simple open-close switch for controlling the jaws.

Furthermore, the controller 120 advantageously includes the transverse vibration on the moveable portion 76 of the housing 74. This provides the user with additional feedback not related to the gripper itself and this feedback can be provided even when the finger gripper cannot supply such feedback. For example, when the gripper control is at an extreme of travel, such as being fully closed, a hard stop is encountered such that no further spring force can be output. However, a vibration can be output on moveable portion 76 which continuously informs the user of objects encountered by the slave device or other controlled object even when force feedback is not possible on the gripper control 36. Furthermore, the vibration of the moveable portion 76 is relative to the gripper control, so that the gripper control need not vibrate to provide such feedback to the user. Since the gripper control need not vibrate, the sensing of the position of the finger pads is not distorted by any vibration forces. Finally, the moveable portion 76 can supply a vibration or similar high frequency, low-amplitude tactile sensation to the user, which is advantageous for representing events such as collisions between the slave and a hard surface in the slave environment.

Controller 120 also preferably includes roller 80 which is rotatably coupled to fixed portion 75 of the housing and whose rotation about axis A is sensed by sensor 108. For example, roller 80 can be coupled to sensor 108 by a rotating shaft. Roller 80 and buttons 82 and 84 preferably function similarly as described above.

Figure 5A:
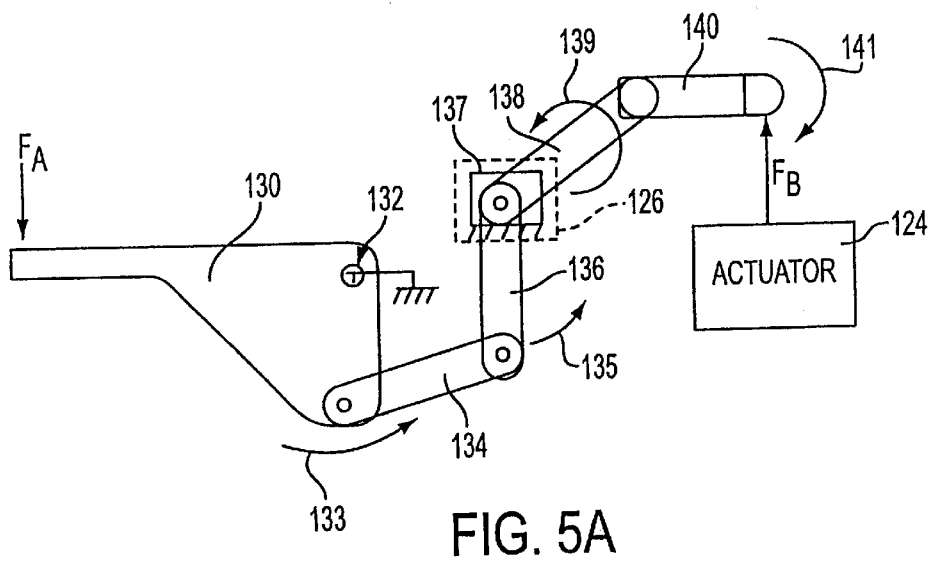
FIG. 5a is a diagrammatic illustration of a portion of the linkage mechanism of the embodiment shown in FIG. 4.

FIG. 5a is a schematic diagram of the linkage mechanism 122 and actuator 124. Since a longer range of motion is desired for gripper control 36 than for the moveable portion 76, a linkage mechanism is preferably used to transmit the forces from the actuator 124 to the gripper pads 78. The linkage mechanism of FIGS. 5a and 5b amplifies motion (displacement) of the finger pads relative to motion of actuator 124, e.g. if the bobbin of the actuator moves 1/8" then the finger pad moves 1/4"; these displacements and the relation between these displacements can be different in other embodiments. A force $F_A$ is applied by the user when pushing down on the gripper pads 78a and 78b. For explanatory purposes, only one of the gripper pads 78 and its associated linkage is shown in FIG. 5a. Gripper member 130 is coupled to a gripper portion 78 and is a lever arm that pivots about a grounded pivot point 132. The gripper member 130 is also rotatably coupled to a first linkage 134, and the first linkage 134 is rotatably coupled to a central link member 136. Central link member 136 is rotatably coupled to a ground 137. The members 130, 134, 136, and ground 137 effectively form a 4-bar linkage. A rotating shaft 138, which torsionally rotates about its lengthwise axis, is rigidly coupled to member 136. Furthermore, the sensor 126 can be coupled to shaft 138 to measure the rotation of shaft 138, which is indicative of the motion of member 130 and gripper pad 78. The rotating shaft 138 is rigidly coupled to intermediate member 140. Actuator 124 outputs a force $F_B$ on the end of member 140 not coupled to shaft 138. Sensor 126 can be provided at other locations of the linkage if desired.

The linkage mechanism 122 operates as follows. The force $F_A$ applied by the user on member 130 causes member 130 to rotate about the ground pivot point 132 as shown by arrow 133. This motion causes member 134 to correspondingly pivot with the member 130 and causes member 136 to pivot about grounded 137, as shown by arrow 135. Since member 136 is rigidly coupled to shaft 138, shaft 138 is caused to rotate about its lengthwise axis as shown by arrow 139. This causes member 140 to rotate as shown by arrow 141. When actuator 124 outputs force $F_B$ on member 140 in the direction shown in FIG. 5a, it opposes the motion of the member 140 caused by the user's force $F_A$. The user feels the force as resistance that hinders moving the gripper portions 78 closer together. The actuator 124 can also output a force in the opposite direction to force $F_B$ to assist motion of the gripper pads 78 towards each other, if such a force is desired in a particular application.

Figure 5B:
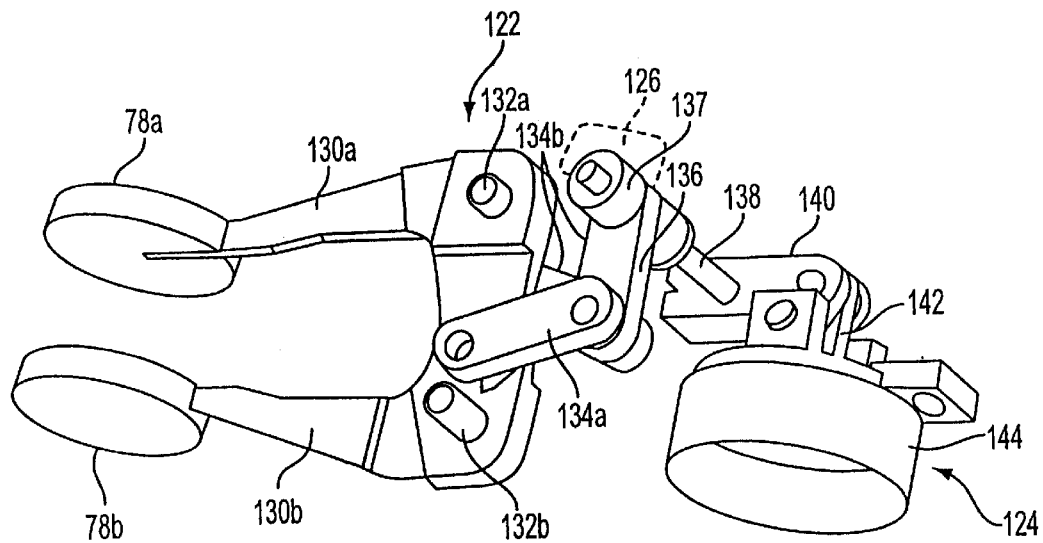
FIG. 5b is a perspective view of the linkage mechanism of the embodiment shown in FIG. 4.

FIG. 5b is a perspective view of linkage mechanism 122 and a portion of actuator 124 of the controller embodiment 120 of FIGS. 4 and 5a. Gripper pad 78a is coupled to gripper member 130a, and gripper pad 78b is coupled to a gripper member 130b. As shown in FIG. 5b, the member 130a rotates about an axis through grounded pivot point 132a, and the member 130b rotates about an axis through grounded pivot point 132b. This rotation can also be considered approximate linear motion; to the user, the movement of the finger pads 78 appears to be linear in a direction toward or away from each other, since the members 130 are relatively long compared to the rotational distance traveled. Link member 134a couples member 130a to the member 136, and link member 134b couples member 130b to the member 136. For example, the member 136 can be positioned between the link members 134a and 134b at the coupling point. Since the gripper members 130a and 130b are both coupled to ground 137 and member 136, both gripper pads 78 are moved the same amount, i.e. when one gripper pad 78 is moved, the other gripper pad is also moved a corresponding distance in the opposite direction. Thus, when one gripper pad 78 is moved "into" the housing 74, the other gripper pad is also moved into the housing at the opposite side of the controller 70.

Sensor 126, shaft 138, and member 140 are also shown. Since actuator 124 is preferably a linear actuator that provides linear force and motion on member 140, a link member 142 is preferably provided between the member 140 and the moveable portion 144 of the actuator 124 (e.g., the bobbin). The link member 142 is rotatably coupled to both member 140 and to moveable portion 144, thus allowing the linear motion of the actuator to be converted to rotary motion of the member 140 about the lengthwise axis of shaft 138.

Figure 6:
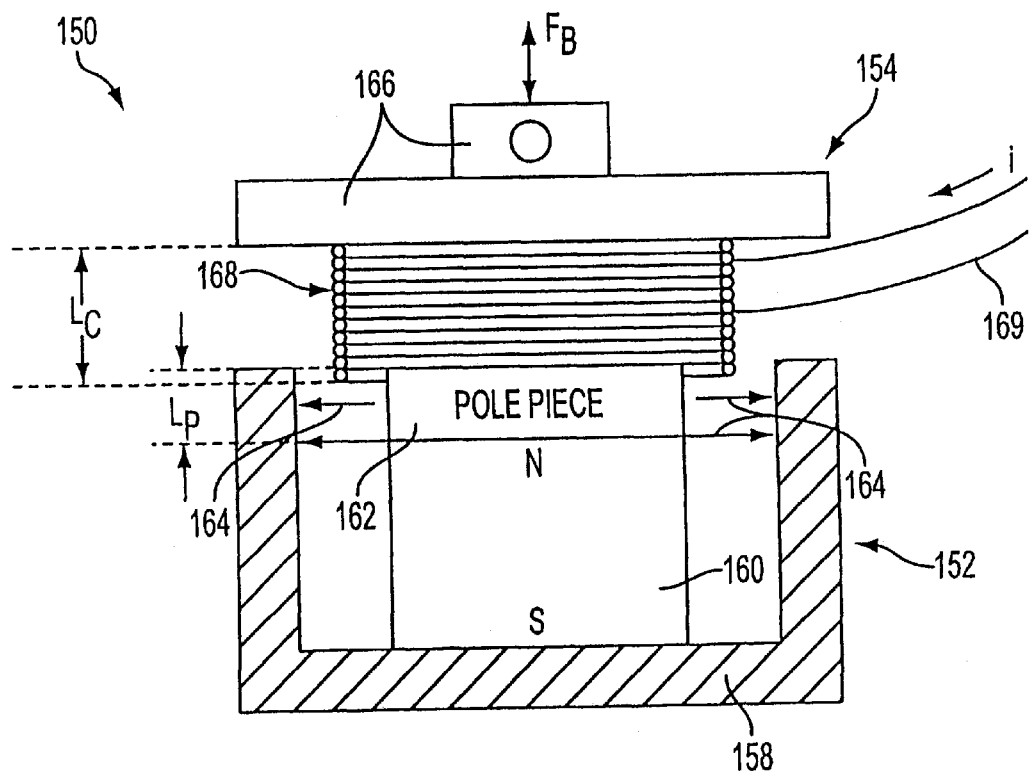
FIG. 6 is a diagrammatic illustration of a voice coil actuator suitable for use in the present invention.

FIG. 6 is a schematic view of a voice coil actuator embodiment 150 suitable for use as actuator 102 and/or actuator 124 of the above-described embodiment. Actuator 150 includes a magnet portion 152 and a bobbin 154. In the described embodiment, the magnet portion 152 is grounded and the bobbin 154 is moved relative to the magnet portion. In other embodiments, the bobbin 154 can be grounded and the magnet portion 152 can be moved. Magnet portion 152 includes a housing 158 made of a metal such as steel. A magnet 160 is provided within the housing 158 and a pole piece 162 is positioned on magnet 160. Magnet 160 provides a magnetic field 164 that uses steel housing 158 as a flux return path. Pole piece 162 focuses the flux into the gap between pole piece 162 and housing 158. The length of the pole piece 162 is designated as $L_P$ as shown. The housing 158, magnet portion 152, and bobbin 154 are preferably cylindrically shaped, but can also be provided as other shapes in other embodiments.

Bobbin 154 is operative to move linearly with respect to magnet portion 158. Bobbin 154 includes a support member 166 and a coil 168 attached to the support member 166. The coil is preferably wound about the support member 166 in successive loops. A member of a linkage, such as member 142 or member 140, is coupled to the support member 166. The length of the coil is designated as $L_C$ in FIG. 6. When the bobbin is moved, the coil 168 is moved through the magnetic field 164. An electric current I is flowed through the coil 168 via electrical connections 169. As is well known to those skilled in the art, the electric current in the coil generates a magnetic field. The magnetic field from the coil then interacts with the magnetic field 164 generated by magnet 160 to produce a force. The magnitude or strength of the force is dependent on the magnitude of the current that is applied to the coil and the strength of the magnetic field. Likewise, the direction of the force depends on the direction of the current in the coil. The operation and implementation of force using magnetic fields is well known to those skilled in the art. One example of voice coil actuators is provided in U.S. Pat. No. 5,805,140, which is incorporated herein by reference.

To achieve the desired magnitude of force output on the gripper control 36, the actuator 150 preferably has a length of coil $L_C$ that is greater than the length of the pole piece $L_P$, such as two to three times greater. This allows a long stroke of bobbin 166 and an approximately constant force to be output over the linear range of motion of the bobbin. If the coil length $L_C$ is made close to or the same as the length of the pole piece $L_P$, a more varying force magnitude and a short stroke results, which is undesirable for the force feedback application of the gripper control of the present invention. The actuator 102 used for applying force to the moveable portion 76 of the housing 74 can use a coil length closer to $L_P$ since only a vibration force is desired to be output on the moveable portion 76 in the preferred embodiment; the vibration force preferably has a short range of motion, thus allowing the use of a short stroke for bobbin 166.

Figure 7:
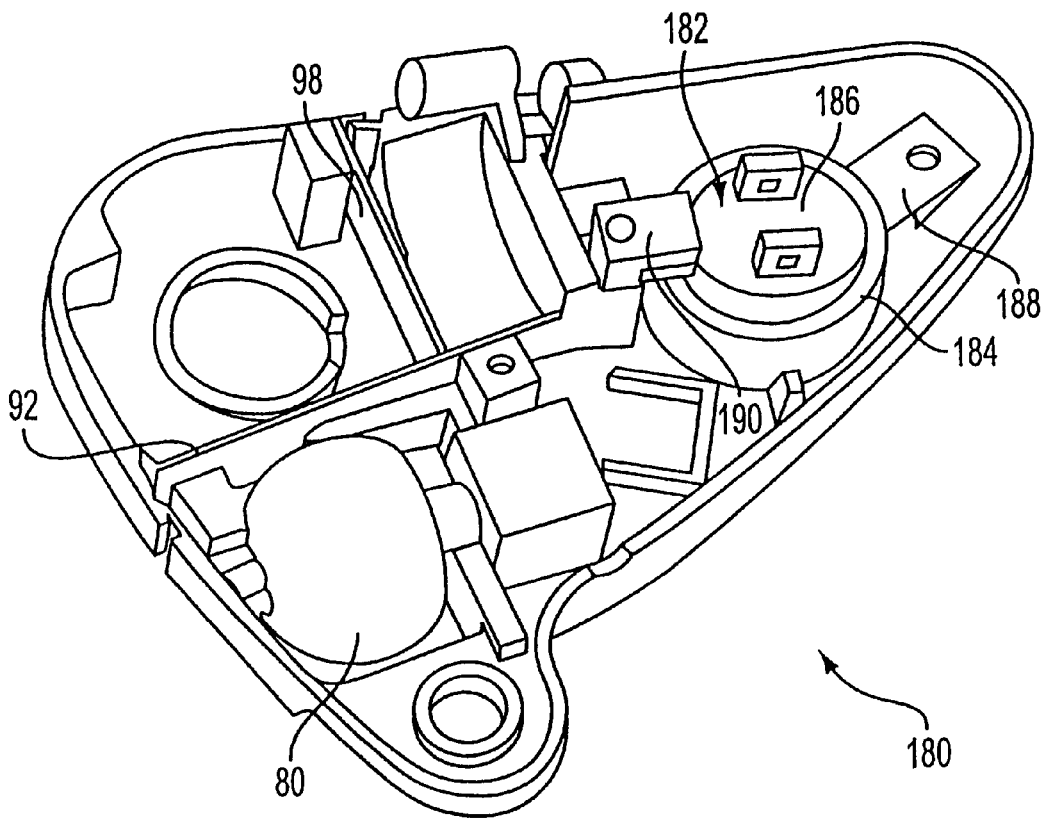
FIG. 7 is a perspective view the mechanism of a third embodiment of the controller of FIG. 2.

FIG. 7 is a perspective view of a different embodiment 180 of the controller 70 of FIG. 2, in which the entire controller 70 is used as a vibrotactile device or "shaker." Controller 180 includes a roller 80 and buttons 82 and 84, as described above. Moveable portion 76 and leaf springs 98 and 92 can also be included, although they are not utilized for any particular function separate from the rest of housing 74, so that the moveable portion 76 can be made unitary with the housing 74 if desired.

Actuator 182 is included to provide vibrotactile feedback to the housing 74. One portion 184 of actuator 182 is grounded to housing 74, and a second portion or bobbin 186 moves with respect to the grounded portion 184. For example, a voice coil actuator similar to the actuator 150 described with reference to FIG. 6 can be used. In the described embodiment, the bobbin 186 is coupled to two leaf springs 188 and 190, and the leaf springs are in turn coupled to the housing 74. In operation, the bobbin is controlled to move back and forth in two linear directions in a degree of freedom, which causes a vibration force to be transmitted through the leaf springs and to the housing 74. The vibration is felt by the user as the controller 70 is held, where the entire housing 74 is vibrated by the actuator 124. In other embodiments, other types of forces can be provided; for example, a single or limited number of jolt forces can be output on the housing 74 to indicate different interactions of the slave or other controlled object with its environment.

Controller 180 allows a user to grasp the natural, comfortable shape as provided with housing 74 and access conveniently-positioned controls such as roller 80 and buttons 82 and 84. These features are combined with basic vibration forces that indicate to the user when the slave is interacting with objects, such as being blocked by a particular surface or having a momentary contact with a surface. These tactile forces may be all that is required in particular applications, making the low-cost embodiment 180 ideal in some circumstances.

Figure 8:
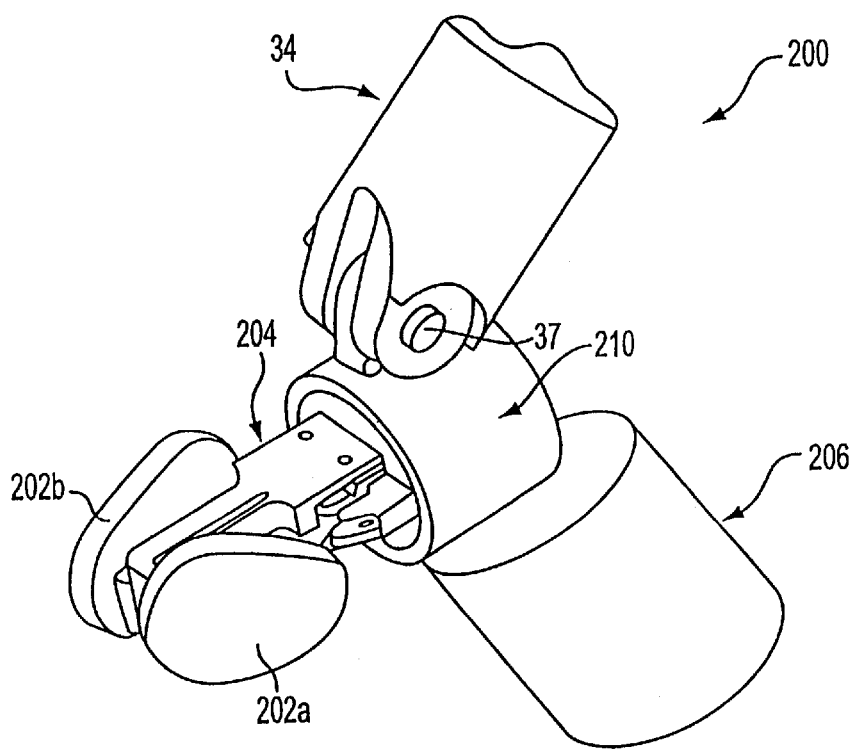
FIG. 8 is a perspective view of a second embodiment of the haptic feedback controller of the present invention for use with the systems of FIG. 1 or FIG. 10.

FIG. 8 is a perspective view of an alternate embodiment 200 of hand controller 22 of the master end effector 12. Embodiment 200 includes a force feedback gripper control mechanism similar to the gripper control 36 of the controller 70. Controller 200 is rotatably coupled to member 34 of the linkage 20 as described in FIG. 1 or other grounded linkage, or alternatively may be a free-moving controller as described above. As described herein, embodiment 200 differs from the above-described embodiments in that no vibrotactile moveable portion 76 or vibrating housing is used in conjunction with the gripper control 36.

Controller 200 includes gripper pads 202a and 202b which the user places his or her fingers to manipulate the control. Pads 202a and 202b are coupled to a linkage 204 which is described in greater detail with respect to FIGS. 9a and 9b. Linkage 204 is coupled to a hand grip 206 which supports the hand of the user. For example, the user can place a thumb on gripper pad 202a with the palm of his or her hand curved around the grip 206, and the index or middle finger of the hand contacting gripper pad 202b. The gripping pads 202a and 202b are preferably shaped in a curved manner as shown to partially surround each used finger to cradle and grip the finger. The housing 208 of the linkage 204 (which is also an extension of the grip 206) is preferably coupled to member 34 of the linkage 20 by a coupling 210. Controller 200 can also be used with other types of linkages instead of linkage 20 that allow multiple degrees of freedom to control slave 14.

An actuator is also preferably included in housing 210 which provides force feedback on the gripper pads 202a and 202b. The force feedback preferably operates similarly to the forces described above for gripper control 36. For example, the gripper pads 202a and 202b are moved towards each other to close the gripper 58 of the slave 14. The positions of the gripper pads 202 are sensed by a sensor, and when the jaws of gripper 58 can no longer be moved closer together due to an object being held, then forces can be output on the gripper pads which resist further motion towards each other and which bias the gripper pads toward the rest position. The user can thus be informed with force feedback how much control is needed to grasp a particular object, allowing more precise control in delicate operations.

Figure 9A:
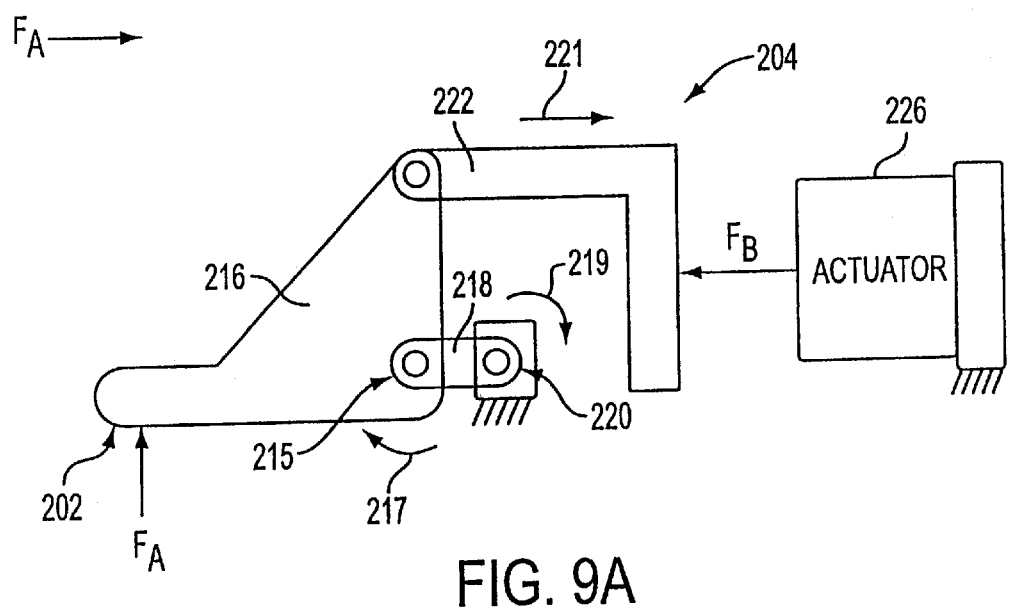
FIG. 9a is a diagrammatic illustration of a portion of the linkage mechanism of the embodiment shown in FIG. 8.

FIG. 9a is schematic diagram of the linkage mechanism 204 and actuator of the gripper control 200 of FIG. 8. The linkage mechanism of FIG. 9a amplifies motion of the gripper pads relative to actuator 124. A force $F_A$ is applied by the user when pushing down on the gripper portions 202a and 202b. For explanatory purposes, only one of the gripper pads 202 and gripper members 216 is shown in FIG. 9a. Gripper member 216 is coupled to a gripper portion 202 and is a lever arm that pivots about a coupling 215. The gripper member 216 is also rotatably coupled to a member 218 at the coupling 215, and the member 218 is rotatably coupled to a grounded member 220. Gripper member 216 is coupled to a linear-moving member 222 at a location on member 216 spaced from coupling 215. Member 222 is coupled to a moving portion of an actuator 226 which moves in a linear degree of freedom. A non-moving portion of the actuator 226 is grounded. For example, the actuator embodiment 150 of FIG. 6 can be used as actuator 226, where member 222 is coupled to the linear-moving bobbin of the actuator and the magnet portion of the actuator is grounded. Actuator 124 outputs a linear force $F_B$ on member 222.

The members 216, 218, 222, and ground (housing 210) effectively form a 4-bar linkage. A sensor 228 is coupled to the gripper members 216 or pads 202 to measure the position of the members 216 and gripping pads 202 in the degree of freedom of motion. For example, a Hall effect sensor can be used, where a magnet 227 is provided on each finger pad 202 facing an extension 231 of the grounded member 220. A Hall effect sensor 229 is provided on each side of the extension 231 facing the associated magnet 228. Thus, the distance between each magnet 227 and sensor 229 is detected and summed with each other to determine the distance between the finger pads 202. Sensors can be provided in other areas of the linkage mechanism 204 and other types of sensors can be employed if desired.

The linkage mechanism 204 operates as follows. The force $F_A$ applied by the user on member 216 causes member 216 to rotate about the coupling 215 as shown by arrow 217. This motion causes member 218 to correspondingly pivot about grounded member 220 in the direction shown by arrow 219. In addition, the pivot about coupling 215 causes member 222 to be moved linearly in the direction of arrow 221. When actuator 226 outputs force $F_B$ on member 222 in the direction shown in FIG. 9a, it opposes the motion of the member 222 caused by the user's force $F_A$. The user feels the force as resistance that hinders moving the gripper portions 202 closer together. The actuator 226 can also output a force in the opposite direction to force $F_B$ to assist motion of the gripper portions 202 towards each other, if such a force is desired for a particular application.

Figure 9B:
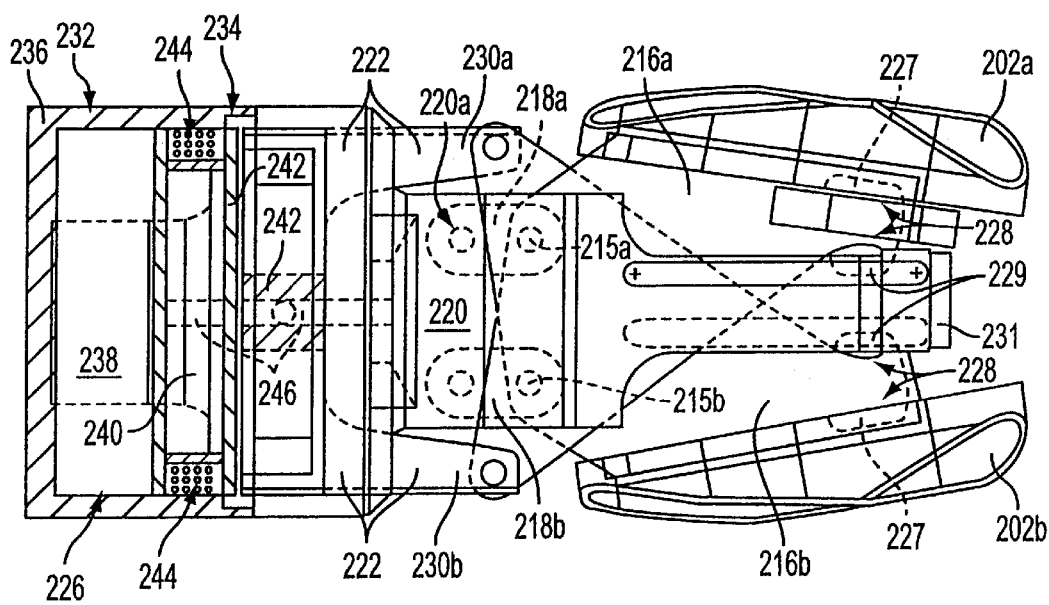
FIGS. 9b and 9c are top plan and side elevational views, respectively, of the linkage mechanism of the embodiment shown in FIG. 8.
Figure 9C:
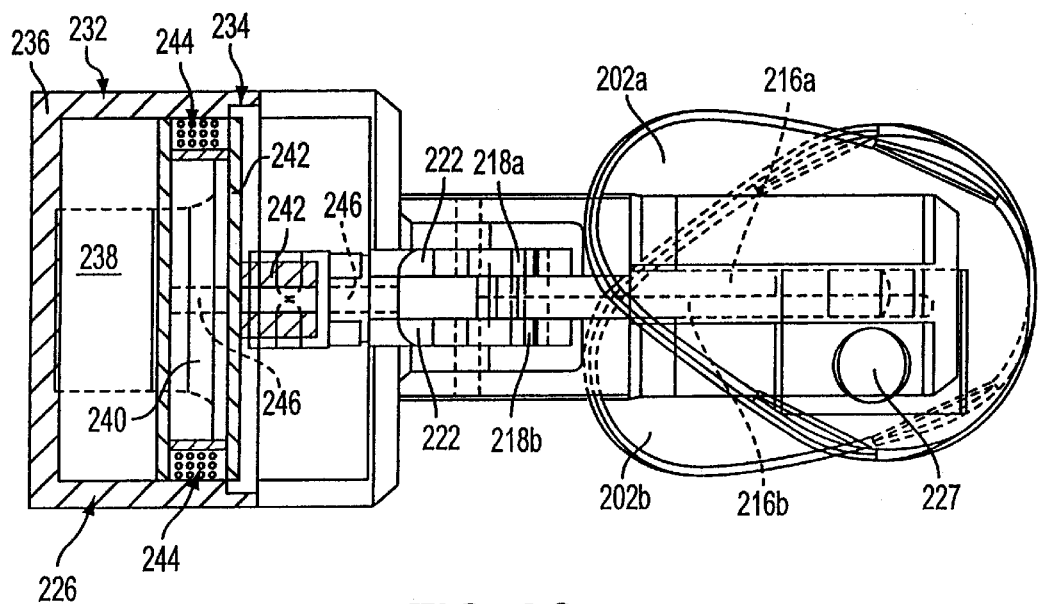

FIGS. 9b and 9c are top plan and side elevational views, respectively, of the linkage 204 and actuator 226 of hand controller 200 shown in FIGS. 8 and 9a. Gripper portion 202a is coupled to member 216a, which is rotatably coupled to members 218a and 222. Likewise, gripper portion 202b is coupled to member 216b, which is rotatably coupled to members 218b and 222. It should be noted that members 218a and 218b are coupled to the same grounded member 220. In addition, member 222 is a single member, where a first extension 230a of member 222 is rotatably coupled to member 216a, and a second extension 230b of member 222 is rotatably coupled to member 216b.

Actuator 226 is shown similar to the voice coil actuator 150 of FIG. 6. A magnet portion 232 and a bobbin 234 are included, where the magnet portion 232 is grounded and the bobbin 234 is moved relative to the magnet portion. A magnet 238 is provided within a housing 236 and a pole piece 240 is positioned on magnet 238. Bobbin 234 is operative to move linearly with respect to magnet portion 232 and includes a support member 242 and a coil 244 attached to the support member 242. Member 222 is coupled to the support member 242. In the described embodiment, bobbin 234 and member 222 are moved linearly along a shaft 246 that extends from the magnet 238, through bobbin 234, and through member 222, and is long enough for the desired stroke length of the bobbin and the range of movement of the gripping portions 202. An electric current I is flowed through the coil 244 to generate a magnetic field and force on the bobbin 234 and member 222, as explained above with respect to FIG. 6. Since low frequency signals and a range of motion is desired for the movement of gripper portions 202, a long stroke voice coil actuator including a coil length $L_C$ greater than the length $L_P$ of the pole piece is desired, as explained above with reference to FIG. 6.

Figure 10A:
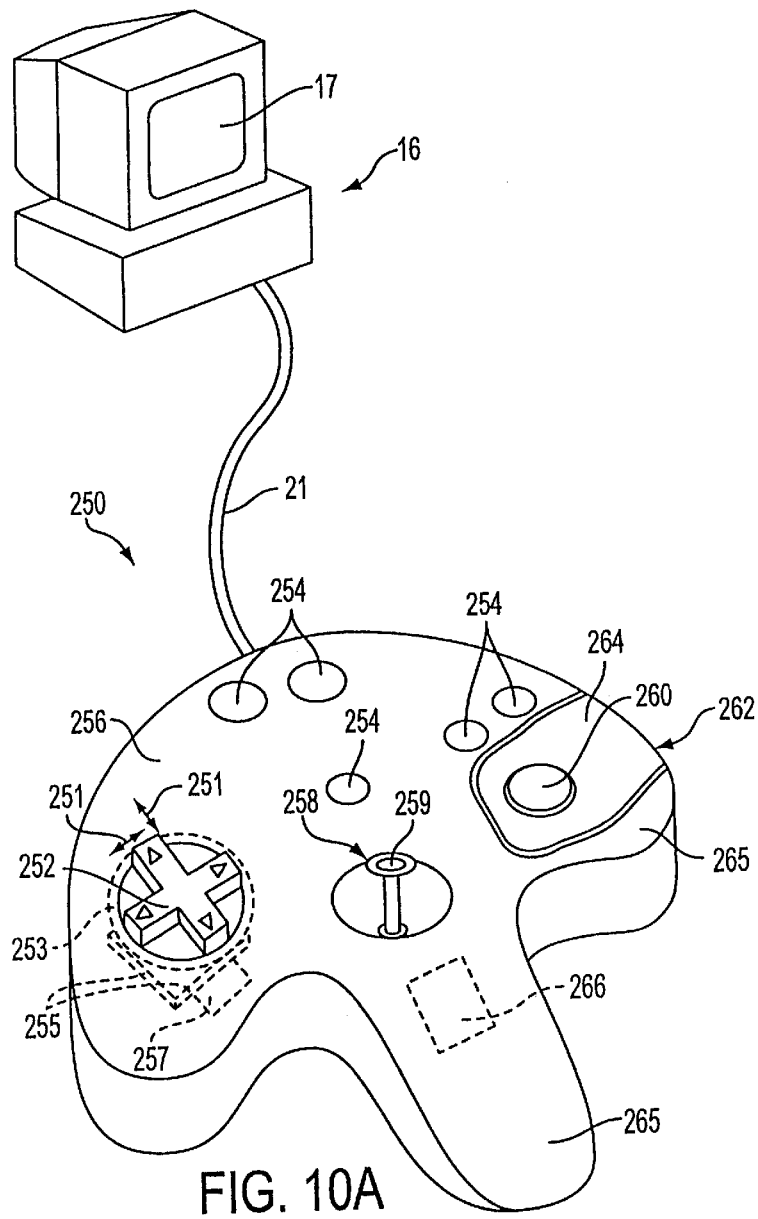
FIG. 10a is a perspective view of a second application for the haptic feedback control device of the present invention, in which a control device interfaces directly with a computer system.

FIG. 10a is a perspective view of a different embodiment of an interface device having haptic feedback and primarily for interfacing a user with a computer generated environment rather than a physical environment through a telemanipulator device. For example, computer games present a graphical environment in which the user controls one or more graphical objects or entities using an interface device. The host computer receives the input from the interface device and updates an application program in response to the input. The software and environment running on the host computer 18 may be of a wide variety. For example, the host application program can be a simulation, video game, graphical user interface (GUI), Web page or browser that implements HTML or VRML instructions, scientific analysis program, virtual reality training program or application, or other application program that utilizes input from the controller 22 and outputs haptic feedback commands to the controller. For example, many game application programs include force feedback functionality and may communicate with the force feedback interface device 12 using a standard protocol/drivers such as I-Force available from Immersion Corporation. Herein, computer 18 may be referred as displaying "graphical objects" or "entities." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object. Computer 16 can be a personal or portable computer, a workstation, a video game console system, a network computer, set top box, or other computing device or appliance. Computer 16 preferably displays graphical images of the environment on a display device such as display screen 17, a television, 3D goggles, LCD display, etc.

An interface device 250 is shown in FIG. 10a which incorporates features of the present invention and which can be used as an interface device to a computer generated environment such as a computer game implemented by a host computer 16. In other embodiments, interface device 250 can be a medical instrument simulator which interfaces with a computer-generated environment that simulates a medical process, such as surgery. Interface device 250 provides input signals to the host computer 16 from which the computer can ascertain the state, position and/or orientation of one or more controls of the controller 250. The information can be translated to an image on a computer display apparatus such as screen 17. The controls of controller 250 are manipulated by the user, which indicates to the computer how to update the implemented program. An electronic interface included in housing 256 of control device 250 can couples the device 250 to the computer 16. A suitable electronic interface is described in detail with reference to FIG. 12. The control device 250 is coupled to computer 16 by a cable 21. In other embodiments, signals can be transmitted between interface device 250 and computer 16 by wireless transmission and reception.

Like many game controllers of the prior art, device 250 can include a directional game pad 252 and several different buttons 254 provided on different areas of the housing 256. Device 250 may also include a fingertip joystick 258 which can be moved in two degrees of freedom by the finger of a user.

Interface device 250 can also include a force feedback control 260. In one embodiment, control 260 is similar to a button, where the control can be depressed by the user into the housing 254. Such a button control can provide a proportional input to a host computer, indicating the distance or amount that the button is pushed. Preferably, forces are output on the control by an actuator in the device 250 as the user moves it. These forces can be colocated such that the user feels the forces in the degree of freedom of movement of the button. For example, a spring or damping resistance force can be applied to resist movement of the button. Alternatively, texture forces or time-varying forces such as jolts can be output on the control 260. The control 260 can be implemented using a gripper mechanism similar to the mechanisms described above with reference to FIGS. 2–9. For example, in one embodiment, a single button 260 is provided, in which a single button contact surface similar to a gripper pad 78 coupled to a gripper member 130 is used, and where the other gripper pad 78 and gripper member 130 are not included. Alternatively, two buttons can be provided similar to the two gripper pads 78a and 78b or 202a and 202b, where a first button 260 is provided on the top surface of housing 256, and a second button is provided on the opposite surface of housing 256 directly opposite the first button. Thus, the user can operate the two buttons by using a thumb on the first button, wrapping the palm of the hand around the edge 262 of the housing, and using a finger on the second button on the bottom surface. The first and second buttons can be operated together, similar to the gripper control 36, where the movement of one button causes equivalent movement for the other button. Alternatively, the two buttons can be moved independently of each other. In such an embodiment, a separate mechanism and actuator can be used for each button 260. Another embodiment of providing force feedback to a button is described below with reference to FIG. 10b.

In addition, other controls of control device 250 can be provided with similar force feedback functionality. For example, the directional game pad 252 can be provided with haptic feedback on one or more of the directions of the pad, or on a motion of the entire pad as it is pressed downward (e.g. from the center of the pad). A button 266 is often included on the bottom surface of game controllers similar to the embodiment shown in FIG. 10a, and this button can be provided with haptic feedback similar to button 260.

Figure 10B:
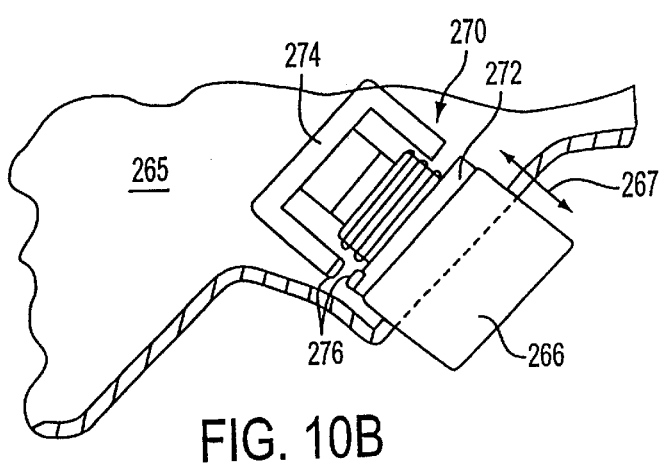

Another example of providing button 266 with force feedback is shown in FIG. 10b. Button 266 can be moved in a degree of freedom indicated by arrow 267. Button 266 can be coupled to a voice coil actuator 270 which can be similar to the voice coil actuator described with reference to FIG. 6. Button 266 can be coupled to bobbin 272 which moves linearly relative to grounded magnet portion/housing 274. A local microprocessor or a host computer can control linear forces on the button in the degree of freedom 267. Furthermore, a sensor can be employed to detect the position of the button in the linear degree of freedom. For example, a Hall effect sensor 276 can be provided between the bobbin 272 and housing 274 to measure the position of the button. Alternatively, an optical sensor (e.g. photodiode sensor) or other type of sensor can be used; or, the current in the coil of the actuator 270 can be measured to determine position of the bobbin and the button 266, where the magnitude of current is proportional to a position of the bobbin.

Using the actuator and sensor coupled to button 266, a variety of force sensations can be output to the user who is contacting the button. For example, jolts, vibrations, textures, spring forces, damping forces, and obstruction forces can be output. The forces can be at least in part based on the position of the button in its degree of freedom; alternatively, the forces can be independent of button position. Other buttons 254 on controller 250, or any similar controller, can also be provided with actuator 270. For example, force feedback joystick, mouse, and steering wheel interface devices can include buttons having force feedback similar to button 266. Examples of such other interface devices are described in greater detail in co-pending patent applications Ser. Nos. 08/965,720, 08/961,790, and 09/058,259, assigned to the same assignee as the present application, and incorporated herein by reference. Furthermore, a moveable portion 264 (described below) can be provided surrounding or near to button 266 and which is contacted by the user when the user operates button 266.

Referring back to FIG. 10a, the interface device 250 can also include a moveable portion 264 of the housing 256 and a fixed portion 265 of the housing, similar to moveable portion 76 described above. For example, the moveable portion 264 can be coupled to a separate actuator that vibrates or otherwise moves the moveable portion similarly as described above with reference to FIG. 3. Preferably, when the user is operating control 260 and/or other buttons and controls of the device 250, at least one of the user's fingers and/or palm is contacting moveable portion 264, so that the user will feel the transverse motion and vibration of the portion 264. Such vibration can be used to inform the user of events and/or interactions occurring in the computer application program, such as a collision of an object with the user-controlled object, or an alarm event that the computer has determined should occur. The vibration can also be maintained while a user-controlled graphical object is contacting a different object, for example. This feature allows a vibration (tactile feedback) to be output to the user independent from the force feedback of control 260. In other embodiments, the moveable portion 264 can be provided around one or more standard, non-force-feedback buttons, joystick, gamepad, or other controls and interfaces. For example, an isometric or elastic control can be provided with a surrounding moveable portion 264. Such an isometric controller can take the form of a sphere, disk, cube, or other shaped object that senses pressure applied to the object to provide input signals to the host computer. "Elastic" controllers are similar but typically allow a small amount of motion and/or of the object when pressure is applied by the user. The moveable portion 264, or additional moveable portions 264, can also be provided at different locations on the housing 256, such as surrounding game pad 252, joystick 258, or button 266. For example, two different moveable portions 264 can be provided, each corresponding to an axis or degree of freedom of control provided by the game controller.

Other controls can include the haptic feedback features described above. For example, gamepad 252 can be provided with an actuator similar to actuator 270 and a sensor such as sensor 276 to allow force feedback functionality. For example, the gamepad 252 can be pushed as a whole unit in a degree of freedom that is sensed and actuated similarly to button 266. Alternatively, each of the four direction buttons on the gamepad 252 can be similarly provided with its own force feedback. In yet a different embodiment, a force feedback gamepad similar to gamepad 252 can be implemented by using a force feedback gripper pad like button 260 for each direction of the gamepad, e.g., each of four directional buttons is provided at 90 degree spacings about a circular path (eight buttons can also be provided, including diagonal directions). Each button can be connected to a voice coil actuator to provide force feedback in a direction approximately perpendicular to the surface of the housing surrounding that button. The buttons can be connected to the actuator directly, similar to button 266, or through a linkage, such as in the embodiments of FIGS. 5, 9 or 11.

The gamepad 252 can also be provided with tactile feedback similar to the moveable portion 264 of the device. For example, a gap 253 can be provided between the gamepad 252 and the fixed portion 265 of the housing to allow the gamepad 252 to vibrate in directions shown by arrows 251. To provide the tactile feedback, a similar mechanism to that shown above with respect to FIGS. 3 and 4 can be used. For example, flexible members 255 couple the gamepad 252 to the fixed portion 265 of the housing. An actuator 257, similar to the actuator 104 described above, can be used to output the tactile force to the flexible member 255, which transmits the force to the gamepad. The gamepad 252 thus can be provided with high frequency force sensations similarly to the moveable portion 264. Other controls of the game controller 250 can also be provided with such tactile feedback. For example, the finger joystick 258 can be provided with tactile feedback by vibrating the stick 258 itself, and/or by providing a central surface 259 on the top of the joystick 258 which moves or vibrates with respect to the surrounding surface of the joystick. Alternatively, central surface 259 can be a button or similar control.

In yet other embodiments, a similar force feedback control 260 and/or moveable portion 264 of the housing can be implemented in other devices. For example, a hand-held remote control device can be used to access the functions of a device or appliance remotely by a user, such as a television, video cassette recorder, sound stereo, internet or network computer connected to a television, etc. For example, one popular device is Web-TV™, which is connected to a television and displays internet information such as web pages on the television screen. A remote control may include buttons, joystick, and controls similar to those described for device 250 for selecting options of the Web-TV device, of the application program running on the device, or of web pages. The remote control can include a force feedback control 260 and/or a moveable portion 264 of the housing to provide force feedback for use in aiding the selection of functions of the controlled device and to inform the user of interactions and events occurring for the device. Other control devices or grips that can include the moveable portion 264 and/or the force feedback button 260 include a mouse or trackball device for manipulating a cursor or other graphical objects in a computer-generated environment; or a pressure sphere, stylus, or the like. For example, the moveable portion 264 of the housing can be provided around buttons on a mouse.

It should also be noted that a controller device similar to device 250, i.e. having buttons and other controls similar as those included for device 250, can also be used to control the slave 14 in the telemanipulator system 10 as shown in FIG. 1.

Figure 11:
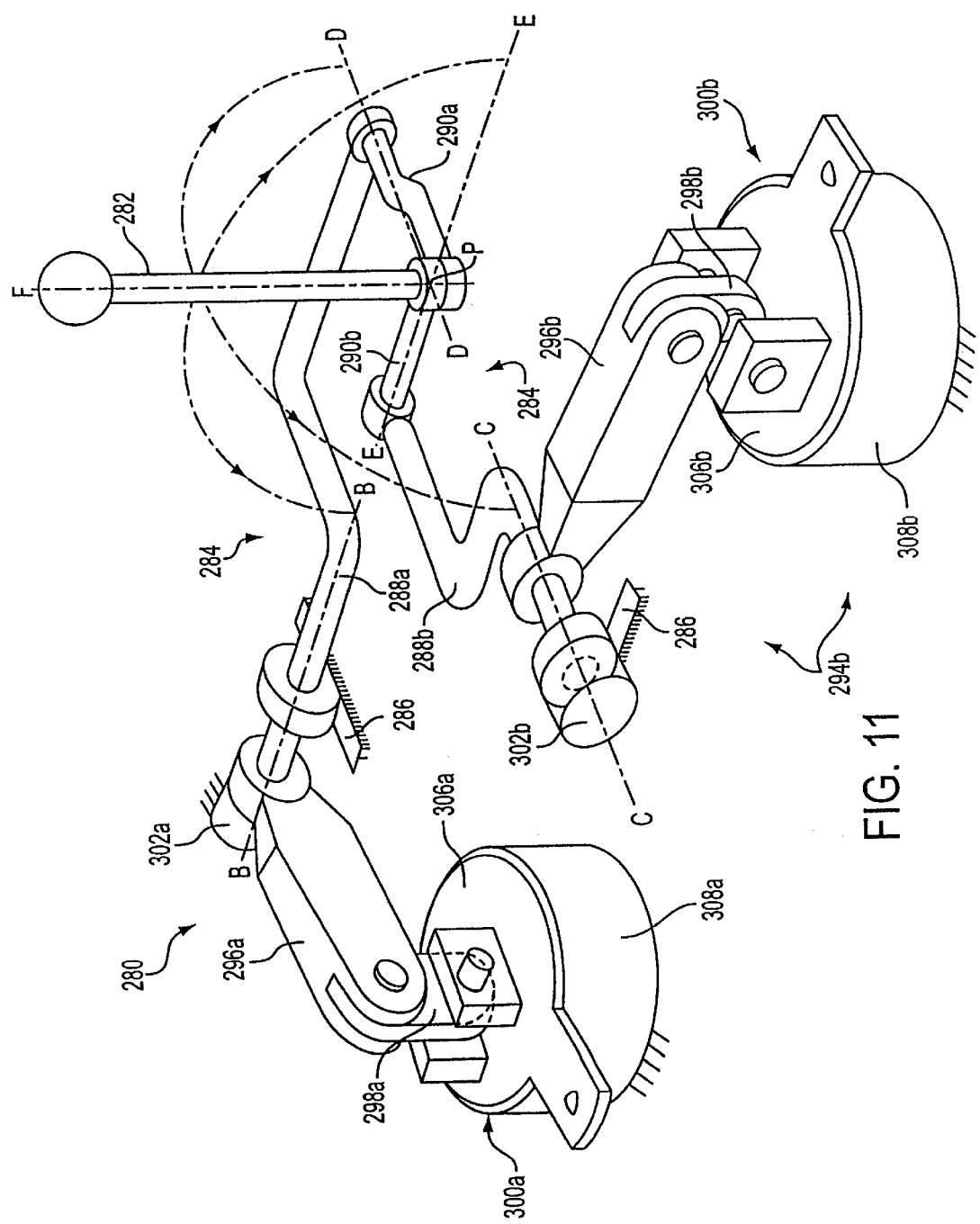
FIG. 11 is an alternate embodiment of a haptic feedback control device including the voice coil actuators of the present invention.

FIG. 11 is a perspective view of an alternate embodiment 280 of a force feedback interface device for use in the applications described herein, such as controlling computer generated objects in application programs and controlling slave devices in telemanipulator systems. Device 280 includes a manipulandum 282 coupled to a gimbal or linkage mechanism 284, to which transducer systems 294 are coupled. Manipulandum 282 is shown in the described embodiment as a joystick handle, but can be a variety of other objects, including a mouse, trackball, medical instrument, or other grip. For example, one use for device 280 is in the controller 250 of FIG. 10a, where the manipulandum 282 is used for fingertip joystick 258.

Gimbal mechanism 284 can be of a variety of types of linkages. In FIG. 11, a five-bar closed-loop linkage is shown that provides in two degrees of freedom to manipulandum 282, where the members of the gimbal mechanism are rotatably coupled to one another through the use of bearings or pivots. A ground member 286, shown schematically, is provided as support, where two extension members 288a and 288b are rotatably coupled to the ground member. A central member 290a is rotatably coupled to extension member 288a and a central member 290b is rotatably coupled to extension member 288b. Central members 290a and 290b are rotatably coupled to each other at an intersection point P, where the manipulandum is preferably coupled to one of the central members 290. The gimbal mechanism operates such that extension member 288a can rotate about an axis B, central member 290a can rotate about a floating axis D, extension member 288b can rotate about axis C, and central member 290b can rotate about floating axis E. The axes D and E are "floating" in the sense that they are not fixed in one position as are axes A and B. Axes A and B are substantially mutually perpendicular. The five-bar linkage is arranged such that extension member 288a, central member 290a, and central member 290b can be rotated about axis B in a first degree of freedom. Furthermore, extension member 288b, central member 290b, and central member 290a can be rotated about axis C in a second degree of freedom. A similar structure is also disclosed in parent U.S. Pat. No. 5,731,804, which is incorporated by reference herein. In alternate embodiments, additional degrees of freedom can be provided. For example, manipulandum 282 can be rotated about axis F extending perpendicularly from the plane formed by floating axes D and E. Or, manipulandum 282 can be linearly translated along floating axis C. These degree of freedom can be sensed and actuated, if desired. Suitable embodiments of mechanism 284 are described in greater detail in U.S. Pat. No. 5,731,804, and co pending application Ser. Nos. 09/058,259, and 09/138,304, filed Aug. 21, 1998 by Bruneau et al., which are incorporated herein by reference. Other linkage mechanisms can also be used in other embodiments. For example, a slotted bail mechanism suitable for use is described in U.S. Pat. No. 5,767,839, incorporated herein by reference.

Two transducer systems 294a and 294b as shown in FIG. 11 are included to sense motion in the two degrees of freedom of manipulandum 282 and to output forces on the manipulandum in those degrees of freedom. Transducer system 294a includes a first member 296a, a second member 298a, an actuator 300a, and a sensor 302a. First member 296a is rigidly coupled to extension member 288a such that when extension member 288a rotates, first member 296a rotates about axis B. Second member 298a is rotatably coupled to first member 296a at the end of member 296a not coupled to extension member 288a. The other end of second member 298a is rotatably coupled to actuator 300a. Sensor 302a senses rotational motion and/or position of extension member 288a about axis B and is indicative of the motion or position of manipulandum 282 in that degree of freedom. Alternatively, the voice coil actuator 300a can be used to sense the position of the manipulandum as described above.

Actuator 300a can be implemented as a variety of different types of actuators. In the described embodiment, actuator 300a is preferably a grounded linear voice coil actuator that is similar in structure and operation to the voice coil actuator 150 described above with reference to FIG. 6. A bobbin 306a is preferably moved in a linear degree of freedom with respect to a grounded magnet portion 308a. The bobbin 306a includes a coil through which an electrical current is flowed, creating a magnetic field that interacts with a magnetic field from the magnet in magnet portion 308a to create a force to move the bobbin relative to the magnet portion. The members 298a and 296a transmit the output force to the extension member 288a, which in turn transmits the force through central member 290a to manipulandum 282 about axis B. Second member 298a allows the linear motion of the bobbin 306a to be converted to a rotary motion through member 296a about axis B. Transducer system 294b has equivalent components to system 294a and operates in a similar manner to provide forces to manipulandum 282 about axis C. Therefore, in the described embodiment, actuators 300a and 300b are oriented approximately parallel to each other, such that the motion of the bobbin of one actuator in its linear degree of freedom is approximately parallel to the motion of the bobbin of the other actuator in its linear degree of freedom. Alternatively, the magnetic portions can be moved and the bobbins grounded. Furthermore, in the described embodiment, the direction of this linear motion of the actuators 300 is approximately orthogonal to the plane AB defined by axes A and B. This orientation of the actuators 300 can provide a more efficient layout for the actuators than if they were oriented in different directions. For example, the two actuators 300 can be positioned on a single circuit board or other support to save room in the housing of a device.

Figure 12:
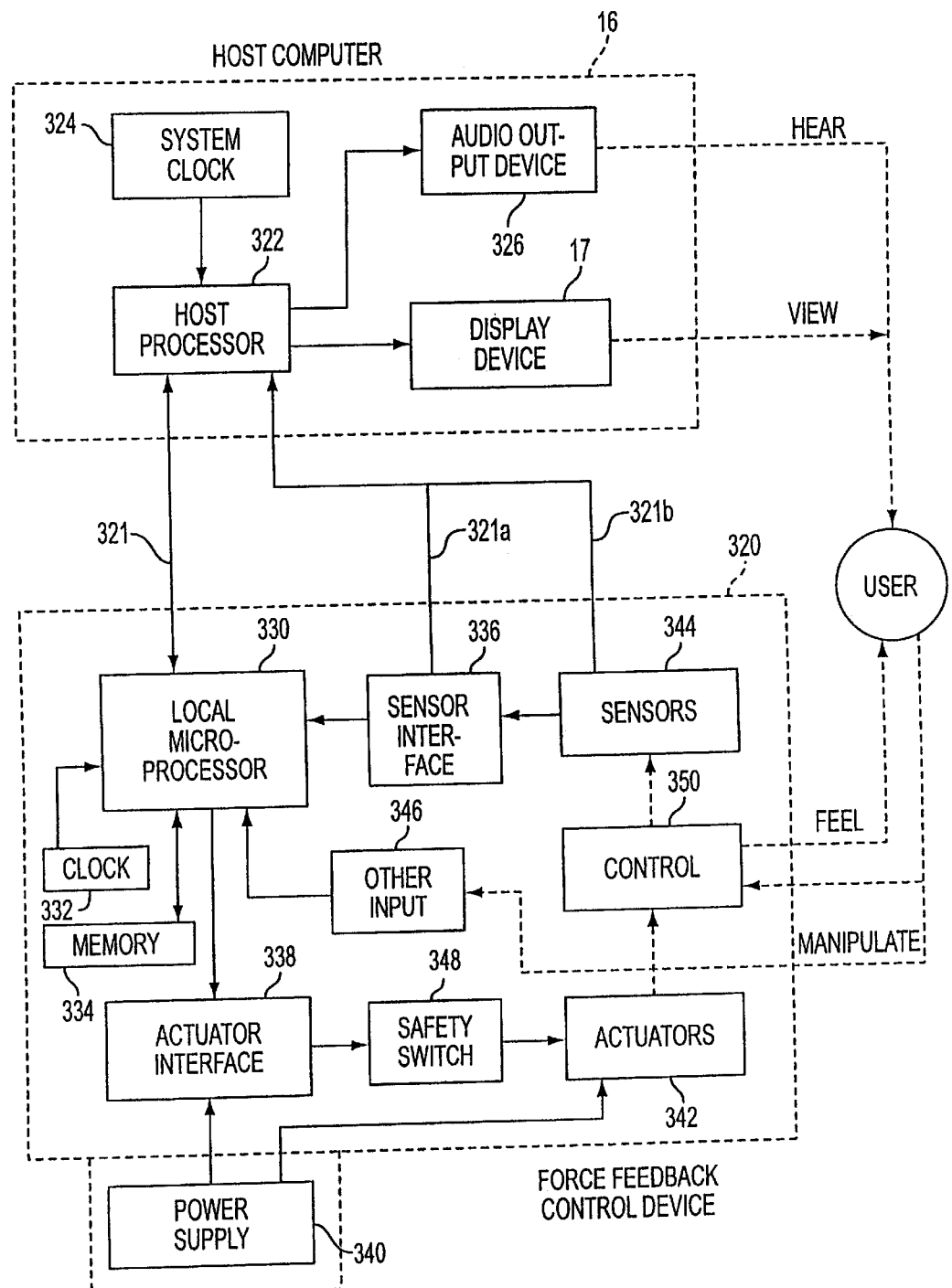
FIG. 12 is a block diagram of a haptic feedback control system illustrating the present invention.

FIG. 12 is a block diagram illustrating a haptic feedback control device 320 and host computer 16 suitable for use with the present invention. Control device 320 can be any of the described embodiments, including controller 22, 70, 250, or 280. A system similar to that of FIG. 12 is described in detail in U.S. Pat. No. 5,734,373 which is hereby incorporated by reference herein in its entirety.

As explained with reference to FIG. 1, computer 16 is preferably a personal computer, workstation, video game console, or other computing or display device. Host computer system 16 commonly includes a host microprocessor 322, a clock 324, a display device 17, and an audio output device 326. Host microprocessor 322 can include a variety of available microprocessors from Intel, AMD, Motorola, or other manufacturers. Microprocessor 322 can be single microprocessor chip, or can include multiple primary and/or co-processors and preferably retrieves and stores instructions and other necessary data from random access memory (RAM) and read-only memory (ROM) as is well known to those skilled in the art. In the described embodiment, host computer system 16 can receive sensor data or a sensor signal via bus 321 from sensors of device 320 and other information. Microprocessor 322 can receive data from bus 321 using I/O electronics, and can use the I/O electronics to control other peripheral devices. Host computer system 16 can also output commands to interface device 320 via bus 321 to cause haptic feedback.

Clock 324 can be a standard clock crystal or equivalent component used by host computer 16 to provide timing to electrical signals used by host microprocessor 322 and other components of the computer system 16 and can be used to provide timing information that may be necessary in determining force or position values. Display device 17 is described with reference to FIG. 10a. Audio output device 326, such as speakers, can be coupled to host microprocessor 322 via amplifiers, filters, and other circuitry well known to those skilled in the art. Other types of peripherals can also be coupled to host processor 322, such as storage devices (hard disk drive, CD ROM drive, floppy disk drive, etc.), printers, and other input and output devices. Slave 14 can also be considered a peripheral in the telemanipulator system 10.

Control device 320 is coupled to host computer system 16 by a bi-directional bus 321. The bi-directional bus sends signals in either direction between host computer system 16 and the interface device 320. Bus 321 can be a serial interface bus, such as USB, RS-232, or Firewire (IEEE 1394), providing data according to a serial communication protocol, a parallel bus using a parallel protocol, or other types of buses. An interface port of host computer system 16, such as a USB or RS232 serial interface port, can connect bus 21 to host computer system 16.

Control device 320 can include a local microprocessor 330, local clock 332, local memory 334, sensor interface 336, and actuator interface 338. Device 320 may also include additional electronic components for communicating via standard protocols on bus 321.

Local microprocessor 330 preferably coupled to bus 321 and is considered "local" to device 320, where "local" herein refers to processor 330 being a separate microprocessor from any processors 322 in host computer 16. "Local" also preferably refers to processor 330 being dedicated to haptic feedback and sensor I/O of the device 320, and being closely coupled to sensors and actuators of the device 320, such as within the housing 74 or 256. Microprocessor 330 can be provided with software instructions to wait for commands or requests from computer host 16, parse/decode the command or request, and handle/control input and output signals according to the command or request. In addition, processor 330 can operate independently of host computer 16 by reading sensor signals and calculating appropriate forces from those sensor signals, time signals, and force processes selected in accordance with a host command, and outputting appropriate control signals to the actuators. Suitable microprocessors for use as local microprocessor 330 include the 8X930AX by Intel, the MC68HC711E9 by Motorola or the PIC16C74 by Microchip, for example. Microprocessor 330 can include one microprocessor chip, or multiple processors and/or co-processor chips. In other embodiments, microprocessor 330 can include digital signal processor (DSP) functionality, or be implemented as control logic components or hardware state machine instead of an actual microprocessor chip.

For example, in one host-controlled embodiment that utilizes microprocessor 330, host computer 16 can provide low-level force commands over bus 321, which microprocessor 330 directly transmits to the actuators. In a different local control embodiment, host computer system 16 provides high level supervisory commands to microprocessor 330 over bus 321, and microprocessor 330 manages low level force control loops to sensors and actuators in accordance with the high level commands and independently of the host computer 16. In the local control embodiment, the microprocessor 330 can process sensor signals to determine appropriate output actuator signals by following the instructions of a "force process" that may be stored in local memory 334 and includes calculation instructions, conditions, formulas, force magnitudes, or other data. The force process can command distinct force sensations, such as vibrations, textures, jolts, or even simulated interactions between displayed objects. The host can send the local processor 330 a spatial layout of objects in the graphical environment so that the microprocessor has a mapping of locations of graphical objects and can determine force interactions locally. Force feedback used in such embodiments is described in greater detail in co-pending patent application Ser. Nos. 08/879,296 and U.S. Pat. No. 5,734,373, both of which are incorporated by reference herein.

A local clock 332 can be coupled to the microprocessor 330 to provide timing data, similar to system clock 324 of host computer 18; the timing data might be required, for example, to compute forces output by actuators 342. Local memory 334, such as RAM and/or ROM, is preferably coupled to microprocessor 330 to store instructions for microprocessor 330 and store temporary and other data.

Sensor interface 336 may optionally be included in device 320 to convert sensor signals to signals that can be interpreted by the microprocessor 330 and/or host computer system 16. For example, sensor interface 336 can receive and convert signals from a digital sensor such as an encoder or from an analog sensor using an analog to digital converter (ADC). Such circuits, or equivalent circuits, are well known to those skilled in the art. Alternately, microprocessor 330 or host computer 16 can perform these interface functions. Actuator interface 338 can be optionally connected between the actuators of device 320 and microprocessor 330 to convert signals from microprocessor 330 into signals appropriate to drive the actuators. Interface 338 can include power amplifiers, switches, digital to analog controllers (DACs), and other components well known to those skilled in the art. Power supply 340 can optionally be coupled to actuator interface 338 and/or actuators 342 to provide electrical power. Alternatively, if the USB or a similar communication protocol is used, actuators and other components can draw power from the USB from the host computer. Or, power can be stored and regulated by device 320 and used when needed to drive actuators 342.

Sensors 344 sense the position, motion, and/or other characteristics of particular controls of device 320; for example, sensors 344 can be sensor 126 or the sensors of linkage 20 as described above. Sensors 344 provide signals to microprocessor 330 including information representative of those characteristics. The sensor 344 or sensor interface 336 can optionally provide sensor signals directly to computer 16 as shown by busses 21a and 21b. Typically, a sensor 344 is provided for each degree of freedom in which a manipulandum can be moved and is desired to be sensed, or, a single compound sensor can be used for multiple degrees of freedom. Example of sensors suitable for embodiments described herein are Hall effect sensors, digital rotary optical encoders, linear optical encoders, analog sensors such as potentiometers, optical sensors such as a lateral effect photo diode, velocity sensors (e.g., tachometers) and/or acceleration sensors (e.g., accelerometers). Furthermore, either relative or absolute sensors can be employed.

Actuators 342 transmit forces to particular controls of device 320 in one or more directions along one or more degrees of freedom in response to signals output by microprocessor 330 and/or host computer 16, i.e., they are "computer controlled." Actuators 342 can include two types: active actuators and passive actuators. Actuators 342 are preferably the voice coil actuators 150 described above, but can be implemented as other types in different embodiments, such as linear current control motors, stepper motors, pneumatic/hydraulic active actuators, a torquer (motor with limited angular range), magnetic particle brakes, friction brakes, or pneumatic/hydraulic passive actuators. For example, actuators 342 can include actuator 102, 124, 186, 226, or 300.

The control 350 can be a variety of different objects or manipulandums that are manipulated by a user and which can receive haptic feedback. For example, control 350 can be the finger pads 78 which are sensed and actuated; and/or control 350 can be the entire controller 22 whose housing is actuated (or just the moveable portion that is actuated) and whose position is sensed through linkage 20, for example. Other controls can also be provided as described above. Different types of mechanisms can be used to output force onto controls (such as finger pads 78) and provide the controls with degrees of freedom. Different mechanisms and related features are disclosed in U.S. Pat. Nos. 5,576,727; 5,721,566; 5,691,898; 5,767,839; 5,805,140 and co-pending patent applications Ser. Nos. 08/709,012, 08/736,161, 08/961,790, 08/965,720, and 09/058,259, all hereby incorporated by reference herein their entirety.

Other input devices 346 can optionally be included in device 320 and send input signals to microprocessor 330 and/or host computer 16. Such input devices can include buttons, dials, knobs, switches, voice recognition hardware (with software implemented by host 18), or other input mechanisms as described above. Safety or "deadman" switch 348 can be included in some embodiments of device 320 to provide a mechanism to allow a user to override and deactivate forces output by actuators 342, or require a user to activate actuators 342, for safety reasons. For example, the user can be required to continually activate or close safety switch 348 during manipulation of the device 320 to activate the actuators 342. Embodiments of safety switch 348 include an optical safety switch, electrostatic contact switch, hand weight safety switch, etc.

While this invention has been described in terms of several preferred embodiments, it is contemplated that alterations, permutations, and equivalents thereof will become apparent to those skilled in the art upon a reading of the specification and study of the drawings. For example, the embodiments of the control devices described herein can be used in a variety of applications, from telemanipulator systems to haptic feedback interfacing with computer simulations. In addition, the features described herein can be used interchangeably with other embodiments. Furthermore, certain terminology has been used for the purposes of descriptive clarity, and not to limit the present invention. It is therefore intended that the following appended claims include all such alterations, permutations and equivalents as fall within the true spirit and scope of the present invention.

What is claimed is:

1. A haptic feedback control device for inputting control signals to a computer and for outputting forces to a user of the control device, the control device comprising:

a grip;

a pair of moveable pincher members coupled to said grip and each contacted by a finger of said user when said device is operated, each of said pincher members being moveable in a degree of freedom, both of said degrees of freedom approximately within a single plane, wherein when a first one of said pincher members is moved, a second one of said pincher members is also moved approximately the same distance either towards or away from said first pincher member;

an actuator coupled to said pair of pincher members, said actuator outputting a force on said pincher members in said degrees of freedom of said pincher members; and a sensor that detects a position of both said pincher members in said degree of freedom and outputs a sensor signal indicative of said position which is received by said computer.

2. A haptic feedback control device as recited in claim 1 wherein said pair of pincher members are both pivotally coupled to a third member.

3. A haptic feedback control device as recited in claim 2 wherein said actuator outputs a force in a linear direction, said linear force being converted to a rotary force that is applied to each of said pincher members.

4. A haptic feedback control device as recited in claim 2 wherein each of said pincher members is included in a 4-bar linkage.

5. A haptic feedback control device as recited in claim 4 wherein each of said pincher members is coupled to a ground by a link member, and wherein both of said pincher members are also coupled to a linear-moving member coupled to said actuator.

6. A haptic feedback control device as recited in claim 4 wherein each of said pincher members includes a finger pad for contacting a fingertip portion of a finger of said user.

7. A haptic feedback control device as recited in claim 4 wherein each of said pincher members is coupled to said third member by a link member.

8. A haptic feedback control device as recited in claim 7 wherein said third member has two ends, wherein said link members are coupled to a first one of said ends and said third member is rotated about a second one of said ends.

9. A haptic feedback control device as recited in claim 7 wherein said user operates said device by placing a thumb on one of said finger pads and a finger opposed to said thumb on said other finger pad.

10. A haptic feedback control device as recited in claim 1 further comprising a second actuator that outputs a vibration force on said grip.

11. A haptic feedback control device as recited in claim 1 wherein said haptic feedback control device further comprises:

a housing that includes said grip, said housing having a moveable portion and a fixed portion, wherein said moveable portion is moveable with respect to said fixed portion;

a second actuator coupled to said moveable portion, said second actuator outputting a force to cause said moveable portion to move.

12. A haptic feedback control device as recited in claim 11 further comprising a flexure coupled between said second actuator and said moveable portion.

13. A haptic feedback control device as recited in claim 12 wherein said actuator causes said moveable portion to vibrate with respect to said fixed portion.

14. A haptic feedback control device as recited in claim 1 wherein said control device is a master device in a telemanipulator system such that said grip is coupled to a linkage of a plurality of members to provide at least three degrees of freedom of motion to said control device, and wherein said computer controls a slave device in response to motion of said master device.

15. A haptic feedback control device as recited in claim 14 wherein said slave device includes an arm linkage and an opening/closing gripper, said gripper being controlled by said pincher members.

16. A haptic feedback control device as recited in claim 1 further comprising a roller coupled to said housing and operative to rotate about an axis, and a sensor coupled to said roller and operative to output a sensor signal indicative of a position of said roller about said axis.

17. A haptic feedback control device for inputting control signals to a computer and for outputting forces to a user of the control device, the control device comprising:

a housing including a fixed portion and a moveable portion, wherein said user engages both said fixed portion and said moveable portion of said housing when using said device;

a coupling coupled between said moveable portion and said fixed portion and allowing said moveable portion to move relative to said fixed portion in a direction parallel to an outer surface of said moveable portion, said portion of said outer surface being contacted by said user when said housing is grasped by said user; and an actuator coupled to said coupling, said actuator outputting a force on said coupling to cause said moveable portion to move with respect to said fixed portion.

18. A haptic feedback control device as recited in claim 17 wherein said coupling is a flexure.

19. A haptic feedback control device as recited in claim 18 wherein said actuator outputs an oscillating force to cause said moveable portion to vibrate.

20. A haptic feedback control device as recited in claim 19 wherein said flexure includes two flexure members, each of said flexure members coupled between said moveable portion and said fixed portion, and wherein said actuator outputs force on one of said flexure members.

21. A haptic feedback control device as recited in claim 17 wherein said moveable portion slides in shear with skin of a finger of said user contacting said surface of said moveable portion.

22. A haptic feedback control device as recited in claim 17 further comprising a control manipulable by said user and positioned with respect to said moveable portion such that said user feels said force on said moveable portion when operating said control.

23. A haptic feedback control device as recited in claim 22 wherein said control is fixed in position with reference to said moveable portion.

24. A haptic feedback control device as recited in claim 23 wherein said control is a button.

25. A haptic feedback control device as recited in claim 24 wherein said button is provided with force feedback in a degree of freedom using a button actuator.

26. A haptic feedback control device as recited in claim 23 wherein said control includes a first pincher member, and further comprising a second pincher member accessible to said user on a different side of said housing from said first pincher member.

27. A haptic feedback control device as recited in claim 26 wherein said first and second pincher members are moveable in a degree of freedom approximately within a single plane, wherein when one of said members is moved, the other of said members is also moved.

28. A haptic feedback control device as recited in claim 27 further comprising a second actuator coupled to said first and second pincher members, said second actuator outputting a force on said pincher members.

29. A haptic feedback control device as recited in claim 17 further comprising a sensor coupled to said housing and operative to detect motion of said moveable portion with respect to said fixed portion.

30. A haptic feedback control device as recited in claim 17 wherein said control device is a master device that controls a slave device in a telemanipulator system.

31. A haptic feedback control device as recited in claim 17 wherein said computer displays a graphical environment which with said user interacts using said control device.

32. A haptic feedback control device as recited in claim 31 wherein said haptic feedback control device is a game controller and said computer displays a game.

33. An interface device including haptic feedback and coupled to a host computer, the interface device comprising:
  a housing including a fixed portion and a moveable portion, wherein a user grips an outer surface of said housing when using said device;
  an engageable control operative to receive a user's finger through an opening in said moveable portion in said housing such that said moveable portion at least partially surrounds said engageable control, said engageable control outputting a signal when engaged by said user's finger, said signal being received by said host computer; and
  an actuator coupled to said housing and operative to output a force on said moveable portion of said housing to cause said moveable portion to vibrate with respect to said fixed portion of said housing such that said user engaging said control with said finger feels a shear vibration on said finger.

34. An interface device as recited in claim 33 wherein said engageable control is a finger pad operative to receive a user's finger through an opening in said housing, said finger pad being coupled to a moveable member.

35. An interface device as recited in claim 34 wherein said actuator is a first actuator, and further comprising a second actuator coupled to said housing and operative to output a force on said moveable member.

36. An interface device as recited in claim 33 wherein said engageable control is a button, wherein said signal is responsive to a state of said button.

37. An interface device as recited in claim 33 wherein said moveable portion of said housing completely surrounds said engageable control.

38. An interface device as recited in claim 33 further comprising a sensor coupled to said moveable member and operative to detect motion of said moveable member in a rotary degree of freedom.

39. An interface device as recited in claim 33 further comprising a roller coupled to said housing and operative to rotate about an axis, and a sensor coupled to said roller and operative to output a sensor signal indicative of a position of said roller about said axis.

40. An interface device as recited in claim 39 further comprising a roller actuator coupled to said roller, said roller actuator outputting forces on said roller.

41. An interface device as recited in claim 40 wherein said roller controls a wrist of a slave gripper, and wherein said forces on said roller provide a spring return force that allows rate control of said wrist.

42. An interface device as recited in claim 33 wherein said housing is coupled to a linkage providing at least three degrees of freedom to said interface device, wherein said computer controls a slave device in a telemanipulator system, said slave device being moved in response to manipulation of said interface device in said three degrees of freedom and on said finger pad.

43. An interface device as recited in claim 33 wherein said engageable control is a 4-directional controller pad having at least four directional buttons and operative to output a signal indicating a state of at least one of said directional buttons, and wherein said object controlled by said user and said different object are computer-generated objects displayed on a display screen.

44. A method for controlling an object with a haptic feedback control device, the method comprising:
  outputting a control signal to a computer, said control signal including information describing a manipulation by a user of said haptic feedback control device, wherein said manipulation includes moving a finger pad of said control device in a degree of freedom such that said information in said control signal includes a representation of a position of said finger pad in said degree of freedom; and
  receiving haptic feedback signals from said computer, said haptic feedback signals including:
    information causing a force to be output on said finger pad in said degree of freedom, and
    information causing a vibration of a moveable portion of a housing of said control device surrounding said finger pad.

45. A method as recited in claim 44 wherein said information causing said vibration is sent when said object controlled by said control device interacts with a different object.

46. A method as recited in claim 45 wherein said information causing said force to be output on said finger pad is sent when said object controlled by said control device interacts with a different object.

47. A method as recited in claim 46 wherein said object controlled by said user is a slave device in a telemanipulator system and said different object is a physical object in a physical environment of said slave device.

48. A method as recited in claim 47 wherein said manipulation by said user of said haptic feedback control device includes moving said control device in at least three degrees of freedom, wherein said control signal includes information representing a position of a said master device in said at least three degrees of freedom, wherein said computer moves said slave device in accordance with said position of said master device.

49. A method as recited in claim 44 wherein said vibration is output in a direction parallel to an outer surface of said moveable portion that surrounds said finger pad.

50. A method as recited in claim 44 wherein said finger pad is a first finger pad and further comprising a second finger pad moveable in a degree of freedom such that said first and second finger pads can be moved in a pincher movement either toward each other or away from each other.

* * * * *